(12) United States Patent
Cai et al.

(10) Patent No.: US 11,628,825 B2
(45) Date of Patent: Apr. 18, 2023

(54) METHOD AND SYSTEM FOR COMPENSATING EXCESSIVE NVH IN A VEHICLE FRONT SUSPENSION

(71) Applicant: China Automotive Systems, Inc., Wuhan (CN)

(72) Inventors: Haimian Cai, Ann Arbor, MI (US); Wei Jiang, Sterling Heights, MI (US)

(73) Assignee: CHINA AUTOMOTIVE SYSTEMS, INC., Wuhan (CN)

( * ) Notice: Subject to any disclaimer, the term of this patent is extended or adjusted under 35 U.S.C. 154(b) by 211 days.

(21) Appl. No.: 17/079,054

(22) Filed: Oct. 23, 2020

(65) Prior Publication Data
US 2021/0122359 A1 Apr. 29, 2021

Related U.S. Application Data

(60) Provisional application No. 62/926,061, filed on Oct. 25, 2019.

(51) Int. Cl.
*B60W 30/02* (2012.01)
*B60W 10/20* (2006.01)
*B60W 10/22* (2006.01)

(52) U.S. Cl.
CPC ............ *B60W 30/02* (2013.01); *B60W 10/20* (2013.01); *B60W 10/22* (2013.01); *B60W 2510/202* (2013.01); *B60W 2520/10* (2013.01)

(58) Field of Classification Search
CPC ...... B60W 30/02; B60W 10/20; B60W 10/22; B60W 2510/202; B60W 2520/10; B62D 5/04; B62D 5/0421; B62D 5/0472; B62D 6/06

USPC ......................................................... 701/37
See application file for complete search history.

(56) References Cited

U.S. PATENT DOCUMENTS

| 8,219,283 | B2 * | 7/2012 | Recker | B62D 5/0472 701/41 |
| 2012/0265400 | A1 * | 10/2012 | Oikawa | F02D 11/105 701/37 |
| 2018/0082492 | A1 * | 3/2018 | Stanek | G07C 5/0808 |
| 2018/0244305 | A1 * | 8/2018 | Cai | F16H 25/2214 |
| 2018/0370563 | A1 * | 12/2018 | Schaenzel | B62D 5/0484 |

(Continued)

*Primary Examiner* — Jonathan M Dager
*Assistant Examiner* — Jean W Charleston
(74) *Attorney, Agent, or Firm* — Dickinson Wright PLLC

(57) ABSTRACT

A system and method for actively compensating excessive noise, vibration, and harshness (NVH) in a vehicle front suspension is provided. The method includes sensing a vibration in the vehicle front suspension; generating an input signal representing the vibration in the vehicle front suspension; filtering the input signal using a bandpass filter; and calculating a compensation signal using a proportional-integral-derivative (PID) controller. The method also includes generating a compensation torque, based on the compensation signal, by an electric power steering (EPS) system motor, with the motor coupled to the vehicle front suspension. Method steps for enabling and disabling the active compensation system are also provided. The active compensation is enabled in response to a turn-on criteria being satisfied. The turn-on criteria may include suspension vibration above a threshold, and the suspension vibration being not caused by driver input. The active compensation is disabled in response to a turn-off criteria being satisfied

20 Claims, 18 Drawing Sheets

(56) References Cited

U.S. PATENT DOCUMENTS

2019/0351933 A1* 11/2019 Wang ................. B62D 3/14
2020/0180591 A1* 6/2020 Choi .................. B60W 10/22
2020/0262477 A1* 8/2020 Hirao ................. B60W 30/08

* cited by examiner

METHOD AND SYSTEM FOR COMPENSATING EXCESSIVE NVH IN A VEHICLE FRONT SUSPENSION

CROSS REFERENCE TO RELATED APPLICATIONS

This patent application claims the benefit of U.S. Provisional Patent Application No. 62/926,061, filed Oct. 25, 2019, the content of which is incorporated herein by reference in its entirety.

BACKGROUND OF THE INVENTION

1. Field of the Invention

A system and method for actively compensating excessive noise, vibration, and harshness (NVH) in a vehicle front suspension is provided.

2. Description of the Prior Art

Vehicles, and particularly vehicles having a solid front axle, may experience noise, vibration, and/or harshness (NVH) in the front suspension. One particular type of NVH is a periodic vibration in the suspension, which can persist for some period of time, this periodic vibration may be called 'excessive NVH'. Such excessive NVH may be triggered by a combination of factors including usage of the vehicle, vehicle speed, vehicle suspension components that are worn or which have manufacturing variations, road conditions, steering position, and/or forces on the front suspension, especially different forces between two front wheels. Excessive NVH of the suspension, including the steering wheel, may reduce a driver's ability to control the vehicle. In extreme cases, excessive NVH causes a violent vibration in the steering wheel that cannot be overcome by human force and can only be alleviated or eliminated by reducing the speed of the vehicle. Such excessive NVH may seriously affect the controllability and safety of the vehicle.

Passive steering dampers, also called steering stabilizers, are used in conventional applications for damping vibrations in vehicle front suspensions. Power steering systems, and particularly electric power steering systems, are used to apply a torque to the vehicle front suspension for steering the vehicle. Active detection with compensation is strongly needed when excessive NVH causes severe vibration of the vehicle suspension including the steering wheel.

SUMMARY OF THE INVENTION

A method of actively damping a vehicle front suspension includes sensing a vibration in the vehicle front suspension, and generating an input signal representing the vibration in the vehicle front suspension. The method proceeds with calculating a compensation signal based upon the input signal, and generating a compensation torque based on the compensation signal by a motor coupled to the to the vehicle front suspension.

A system for actively damping a vehicle front suspension is also provided. The system includes a sensor configured to sense a vibration in the vehicle front suspension. The system also includes an electronic control unit configured to generate a compensation signal to reduce the vibration in the vehicle front suspension, and a motor configured to apply a compensation torque to the vehicle front suspension. The compensation torque is based upon the compensation signal.

Advantages of the Invention

The invention, in its broadest aspect, provides a reduction noise, vibration, and harshness (NVH) in a vehicle suspension. Additionally, the system and methods of the present disclosure may be implemented using a conventional electric power steering (EPS) system with little or no additional hardware, and can therefore be implemented in vehicles equipped with EPS with little to no additional cost.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
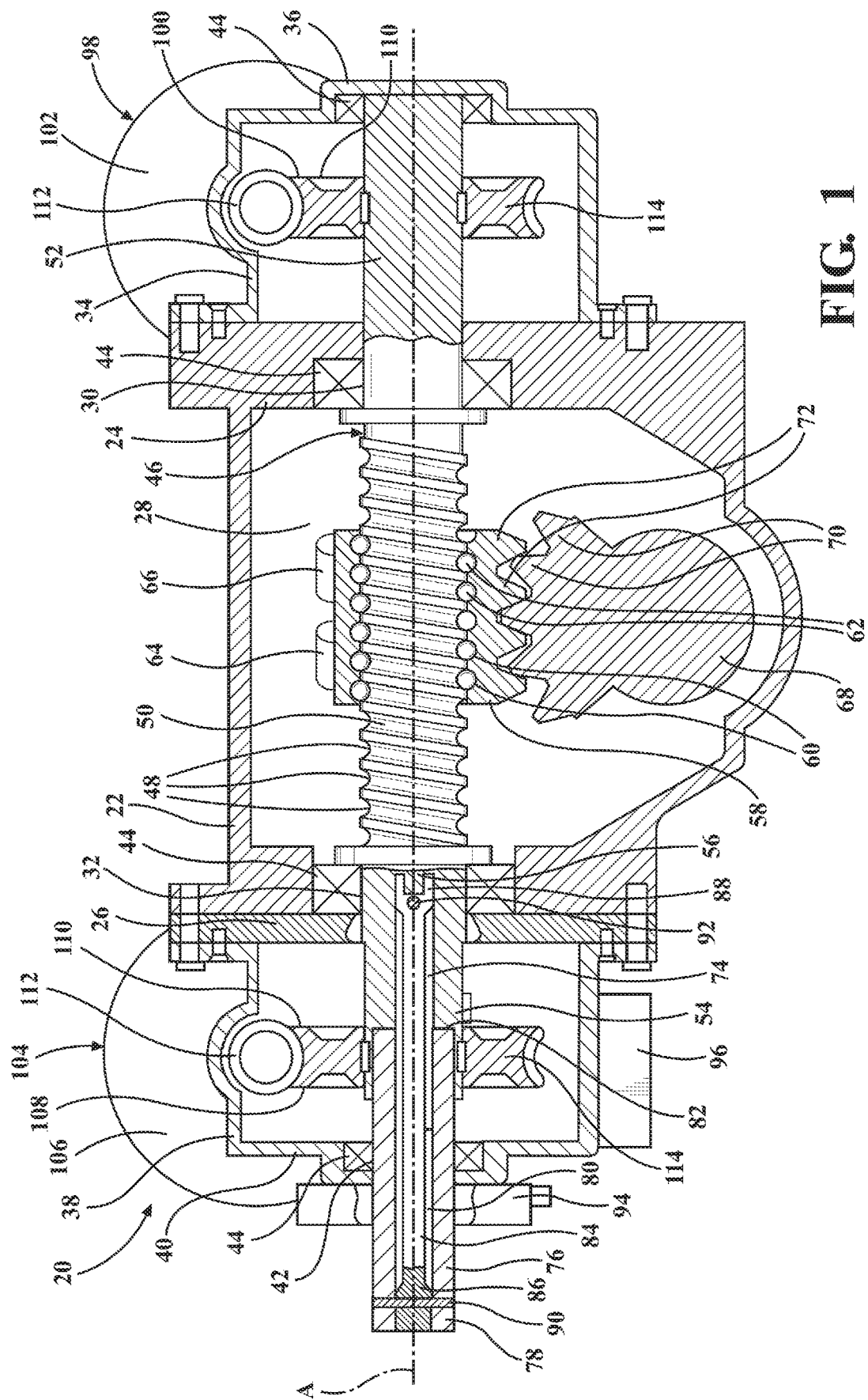
FIG. 1 is a cross-sectional view of a steering gear assembly according to a first embodiment.

Referring to the Figures, wherein like numerals indicate corresponding parts throughout the several views.

FIGS. 1-4 show different embodiments of an electrically powered recirculating-ball steering gear assembly 20 for steering a vehicle. In each of those embodiments, the electrically-powered recirculating-ball steering gear assembly 20 includes a main housing 22 that has a first side wall 24 and a second side wall 26 parallel and spaced from the first side wall 24 along an axis A to establish a chamber 28 therebetween.

The first side wall 24 has a first worm opening 30 disposed on the axis A. The second side wall 26 has a second worm opening 32 disposed on the axis A. A first side housing 34 is connected to the first side wall 24 around the first worm opening 30 in the main housing 22. The first side housing 34 has a protrusion 36 opposite the first worm opening 30. A second side housing 38 is connected to the main housing 22 through the second worm opening 32 and shares the second side wall 26 with the main housing 22. The second side housing 38 has an input wall 40 located parallel to and opposite the second side wall 26. The input wall 40 has an input opening 42 spaced opposite the second worm opening 32 along the axis A. A low friction bearing 44 is disposed in each of the worm openings 30, 32 and the input opening 42 and the protrusion 36.

A worm shaft 46 extends along the axis A in the chamber 28 and through the low friction bearings 44 in each of the worm openings 30, 32 of the main housing 22. The worm shaft 46 has a worm groove 48 that extends helically to establish a worm section 50 disposed in the chamber 28. The worm shaft 46 has a first end section 52 that extends from the worm section 50 and into the low friction bearing 44 in the first worm opening 30 and into the first side housing 34.

The worm shaft 46 has a second end section 54 that has a worm end 56 adjacent the worm section 50 and extends from the worm end 56 and into the low friction bearing 44 in the second worm opening 32 and into the second side housing 38. A ball nut 58 is disposed about a portion of the worm section 50 of the worm shaft 46 and has ball raceways 60 that face the worm section 50 of the worm shaft 46 established helically within the ball nut 58. A plurality of ball bearings 62 that are spherical in shape are disposed in the worm grooves 48 of the worm section 50 of the worm shaft 46 and in the ball raceways 60 of the ball nut 58.

A first recirculating ball mechanism 64 is disposed within the ball nut 58 to recirculate the plurality of ball bearings 62 once the plurality of ball bearings 62 rotate about the worm section 50 two and a half times. A second recirculating ball mechanism 66 is disposed adjacent to the first recirculating ball mechanism 64 within the ball nut 58 to recirculate the plurality of ball bearings 62 once the plurality of ball bearings 62 rotate about the worm section 50 two and a half times.

An output shaft 68 for driving a Pitman arm has an output teeth set 70 disposed radially on the output shaft 68. A nut teeth set 72 extends from the ball nut 58 and engages the output teeth set 70 to move the ball nut 58 linearly along the axis A and to rotate the output shaft 68 in response to the rotation of the worm shaft 46.

The worm shaft 46 has a worm bore 74 within the second end section 54 of the worm shaft 46 along the axis A and closed at the worm end 56 of the second end section 54 of the worm shaft 46. An input shaft 76 responsive to rotation of a steering wheel extends from the second end section 54 of the worm shaft 46 along the axis A and through the low friction bearing 44 in the input opening 42 to an input end 78 and has an input bore 80 within the input shaft 76 along the axis A that is closed at the input end 78 of the input shaft 76. There is a lost motion connection 82 between the input shaft 76 and the second end section 54 of the worm shaft 46 that allows relative lost motion of three to four degrees between the input shaft 76 and the worm shaft 46. A torsion bar 84 extends axially within the input bore 80 and the worm bore 74 and interconnects the input shaft 76 and the worm shaft 46 for biasing against the relative lost motion and has a first torsion end 86 and a second torsion end 88 disposed opposite each other. A first pin 90 extends transversally to the axis A and connects the first torsion end 86 of the torsion bar 84 to the input end 78 of the input shaft 76. A second pin 92 extends transversally to the axis A and connects the second torsion end 88 of the torsion bar 84 to the worm end 56 of the second end section 54 of the worm shaft 46. A torque sensor 94 is disposed about the input shaft 76 for measuring the torque in the input shaft 76 and communicating the torque to the electronic control unit 96.

A first drive system 98 is in the first side housing 34 to provide a steering force in response to a primary steering input. The first drive system 98 includes a first gear set 100 disposed in the first side housing 34 and in driving engagement with the first end section 52 of the worm shaft 46 and a first motor 102 supported by the first side housing 34 and connected to the first gear set 100 and responsive to an electrical signal to rotate the worm shaft 46.

A second drive system 104 for providing a steering force in response to a secondary steering input includes a second motor 106 for redundantly steering the vehicle and a second gear set 108 in driving engagement with the second motor 106 for receiving mechanical input from the second motor 106. The second drive system 104 is mounted in the second side housing 38 and is in driving engagement with the second end section 54 of the worm shaft 46. The worm section 50 of the worm shaft 46 is disposed between the first drive system 98 on the first end section 52 of the worm shaft 46 and the second drive system 104 on the second end section 54 of the worm shaft 46. Placing the drive systems in parallel allows for reduced complexity and a reduction in packaging footprint relative to placing the drive systems in series.

In a first embodiment of the electrically-powered recirculating-ball steering gear assembly 20 shown in FIG. 1, the first gear set 100 of first drive system 98 is a worm reducer 110 that includes a worm gear 112 and a spur gear 114. The second gear set 108 of the second gear system is also a worm reducer 110 that includes a worm gear 112 and a spur gear 114.

Figure 2:
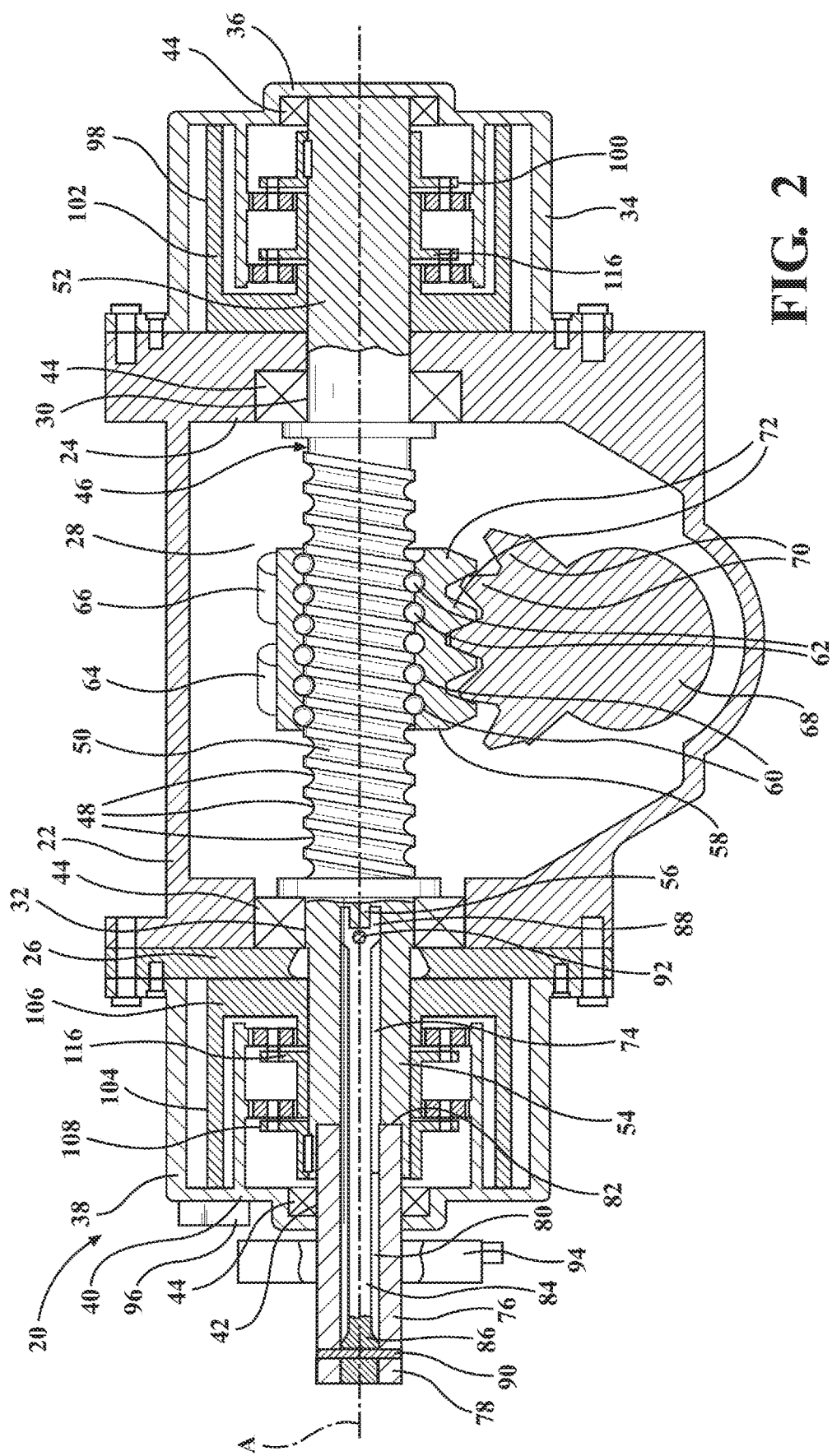
FIG. 2 is a cross-sectional view of a steering gear assembly according to a second embodiment.

In a second embodiment of the electrically-powered recirculating-ball steering gear assembly 20 shown in FIG. 2, the first gear set 100 of the first drive system 98 is a planetary gear group 116 and the first motor 102 is mounted coaxially with the worm shaft 46. The second gear set 108 of the second gear system is also a planetary gear group 116 and the second motor 106 is also mounted coaxially with the worm shaft 46.

Figure 3:
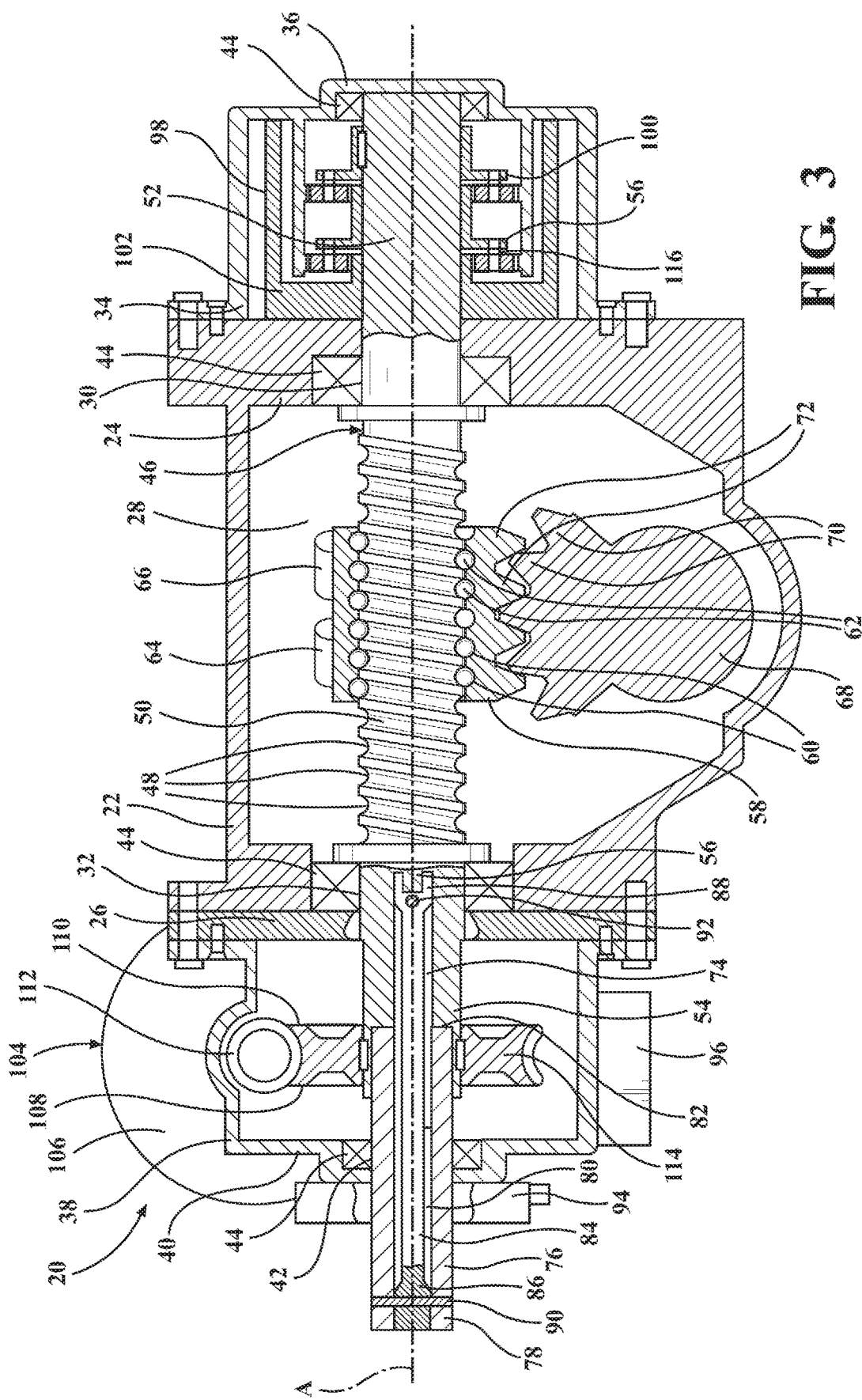
FIG. 3 is a cross-sectional view of a steering gear assembly according to a third embodiment.

In a third embodiment of the electrically-powered recirculating-ball steering gear assembly 20 shown in FIG. 3, the first gear set 100 of the first drive system 98 is a planetary gear group 116 and the first motor 102 is mounted coaxially with the worm shaft 46. The second gear set 108 of the second gear system is a worm reducer 110 that includes a worm gear 112 and a spur gear 114.

Figure 4:
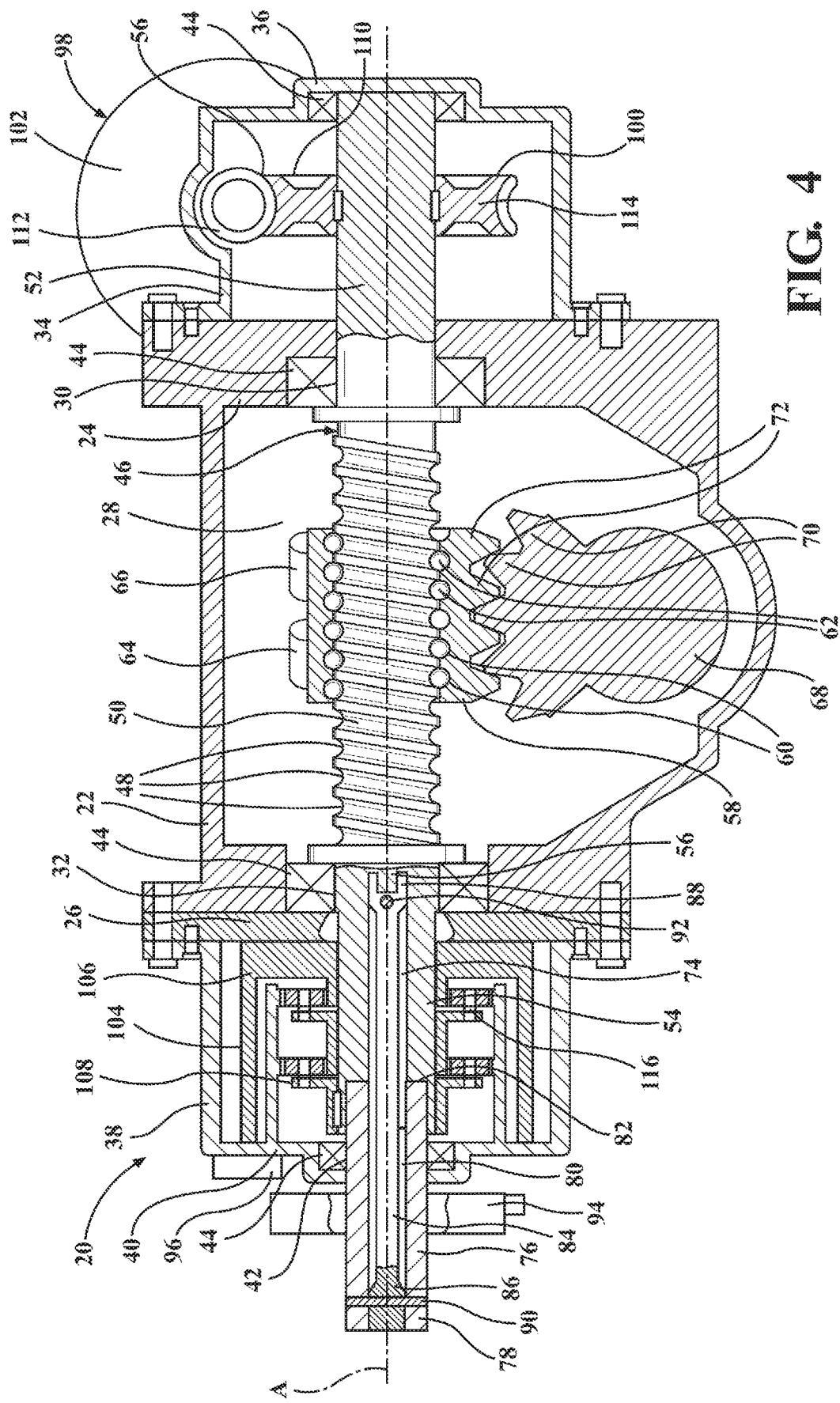
FIG. 4 is a cross-sectional view of a steering gear assembly according to a fourth embodiment.

In a fourth embodiment of the electrically-powered recirculating-ball steering gear assembly 20 shown in FIG. 4, the first gear set 100 of first drive system 98 is a worm reducer 110 that includes a worm gear 112 and a spur gear 114. The second gear set 108 of the second gear system is a planetary gear group 116 and the second motor 106 is mounted coaxially with the worm shaft 46.

An electronic control unit 96 is electrically connected to the first motor 102 for responding to vehicle sensors and processors to control the amount of torque of the first motor 102 to apply to the worm shaft 46 to produce the required movement of the output shaft 68 to turn the wheels of the vehicle.

Figure 5:
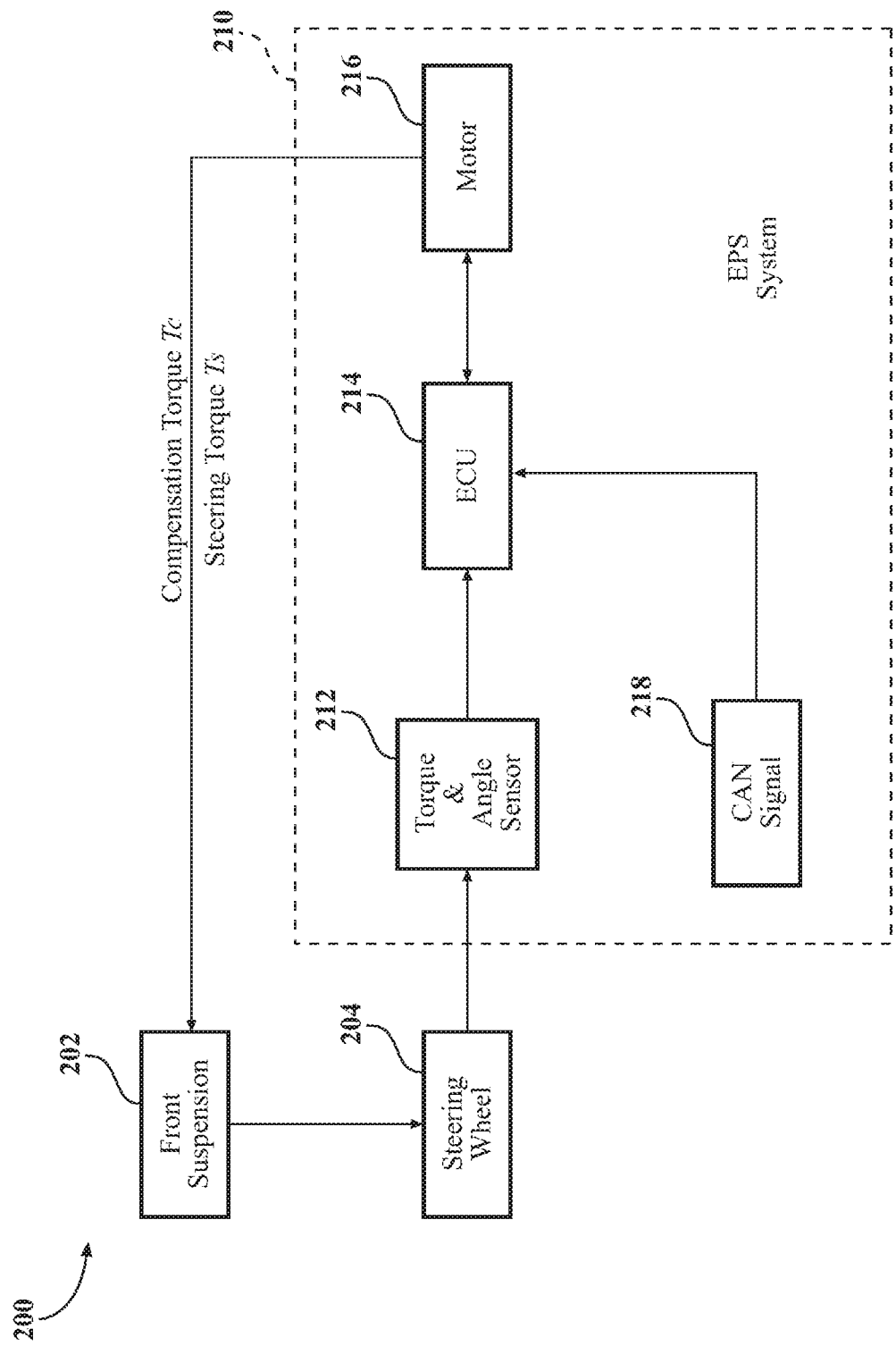
FIG. 5 is a block diagram of a system for actively compensating excessive noise, vibration, and harshness (NVH) in a vehicle front suspension.

FIG. 5 is a block diagram of a system 200 for actively compensating excessive noise, vibration, and harshness (NVH) in a vehicle front suspension. The system 200 may also be called an active compensation system 200, or just "the system" 200, for short. As shown in FIG. 5, the system 200 includes a front suspension 202 coupled to a steering wheel 204 used for controlling steering of the vehicle. The subject system 200 may be used in other configurations of a vehicle front suspension. For example, it may be used in a motorcycle having handlebars instead of a steering wheel. The system 200 includes an electric power steering (EPS) system 210 for supplying powered actuation for steering the vehicle. The EPS system 210 includes a torque and angle sensor 212, which is configured to measure an angle of the steering and/or a torque signal. The torque signal may include a differential torque as a difference between an input torque and an output torque, where the input torque is applied input shaft coupled to the steering wheel 204, and the output torque is applied by an output shaft coupled to the front wheels of the vehicle. The torque signal may be proportional to a twist in a torsion bar coupling the input shaft to the output shaft.

The EPS system 210 also includes an EPS electronic control unit (ECU) 214 that is configured to control the EPS system. The EPS ECU 214 may be the same as the electronic control unit 96, shown in FIG. 4. The EPS ECU 214 may include a general purpose microprocessor and/or microcontroller. Alternatively or additionally, the EPS ECU 214 may include special purpose hardware, such as an application specific integrated circuit (ASIC) and/or a digital signal processor (DSP). The EPS system 210 also includes a motor 216, such as an electric motor, which is configured to apply a steering torque Ts to the front suspension 202 for steering the vehicle. The motor 216 is also configured to apply a compensation torque Tc for actively compensating vibrations, such as excessive NVH, in the front suspension 202 of the vehicle. The EPS ECU 214 is also configured to receive communications signals 218, for example, signals 218 from one or more other controllers in the vehicle via a controller area network (CAN) bus. The communications signals 218 may include vehicle speed or operating mode from an engine control module (ECM) or a vehicle yaw signal from an ECU of an antilock brake system or a traction control system in the vehicle.

Figure 6:
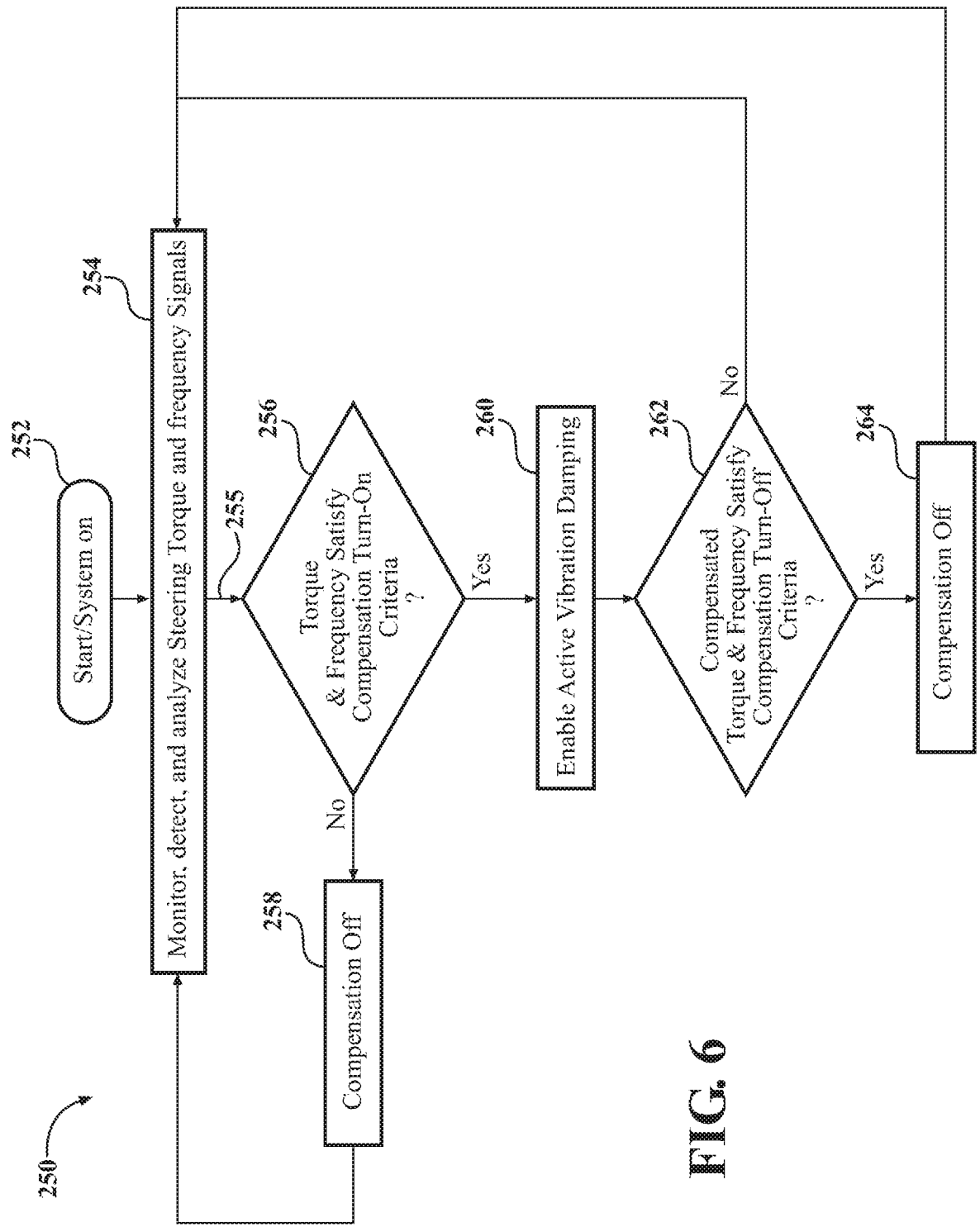
FIG. 6 is a flow diagram showing steps in a method for enabling active vibration.

FIG. 6 is flow diagram showing steps in a method 250 for enabling active vibration. The system 200 may be configured to produce the compensation torque Tc only when the system 200 is in an enabled mode. Similarly, the system 200 may produce no compensation torque Tc when the system 200 is in a disabled mode. The method 250 may be performed by the EPS system 210 having an electrically-powered recirculating-ball steering gear assembly 20, such as those shown in FIGS. 1-4. Alternatively, the method 250 may be performed by an EPS system 210 having a different drive configuration, such as a pinion drive or a rack drive.

The method 250 begins with initializing or starting the system 200 at step 252. This step 252 may be performed manually, for example by a driver turning the system on. Alternatively, this step 252 may be performed automatically in response to some criteria, such as the vehicle being started or placed in a drive mode.

The method 250 includes monitoring, detecting, and analyzing steering torque and frequency signals at step 254. Step 254 may include monitoring one or more input signals generated by sensors that detect parameters which vary with vibration in the vehicle front suspension. Such input signals may include, for example, torque or acceleration in the steering system and/or yaw rate of the vehicle. Step 254 may be performed by a controller, such as the ECU 214 of the electric power steering system 210. The controller may use one or more different inputs, such as steering torque signal, a steering angle signal, and a vehicle speed. The controller may perform one or more different signal processing or other processing upon the steering torque as part of step 254. The controller may produce a control signal 255 indicating the input torque and frequency as part of step 254.

The method 250 also includes determining if the steering torque and frequency signals satisfy a compensation turn-on criteria, which may include one or more enabling conditions, at step 256. The compensation turn-on criteria may be called a "turn-on criteria" for short. Step 256 may be performed by hardware and/or software. In some embodiments, step 256 may be performed by the same controller as step 254. Step 256 may include using the control signal 255 indicating the input torque and frequency. Step 256 may include using one or more other signals or conditions, such as a driving mode, a vehicle speed, a delay timer, and/or one or more predetermined threshold values to determine if the enabling conditions are satisfied. The compensation turn-on criteria may include one or more different enabling conditions being met. The enabling conditions may include, for example, a speed of the vehicle being greater than a speed threshold value, and/or a torque oscillation value being larger than an enabling threshold value. The enabling conditions may also include a steering input shaft vibration being less than a vibration threshold, or a steering input angle that is indicative of driver input not causing the vibration in the vehicle front suspension. In some embodiments, the compensation turn-on criteria may include satisfaction of each of the enabling conditions.

The method 250 includes maintaining the active compensation system 200 in a disabled, or OFF condition at step 258 in response to step 256 determining that the turn-on criteria is not met. The method 250 also includes switching the active compensation system 200 to an enabled, or ON condition at step 260 in response to step 256 determining that the turn-on criteria is met.

The method 250 also includes determining if the steering torque and frequency signals satisfy a compensation turn-off criteria, which may include one or more disabling conditions, at step 262. The compensation turn-off criteria may be called a "turn-off criteria" for short. Step 262 may be performed by hardware and/or software. In some embodiments, step 262 may be performed by the same controller as step 256. Step 262 may include using the control signal 255 indicating the input torque and frequency. Step 262 may include using one or more other signals or conditions, such as a driving mode, a vehicle speed, a delay timer, and/or one or more predetermined threshold values to determine if the disabling conditions are satisfied. The disabling conditions may include, for example, a speed of the vehicle being less than a speed threshold value, a steering input angle that is indicative of a driver input causing the vibration in the vehicle front suspension, and/or a torque oscillation value being less than a disabling threshold value. In some embodiments, the compensation turn-off criteria may include satisfaction of any one of the disabling conditions.

The method 250 includes switching the active compensation system 200 to a disabled, or OFF condition at step 264 in response to step 262 determining that the turn-off criteria is met. The method 250 also includes continuing to monitor, detect, and analyze the steering torque and frequency signals by looping back to step 254 in response to step 256 determining that the turn-off criteria is not met or after switching the active compensation system 200 to the disabled, or OFF condition at step 264.

Figure 7:
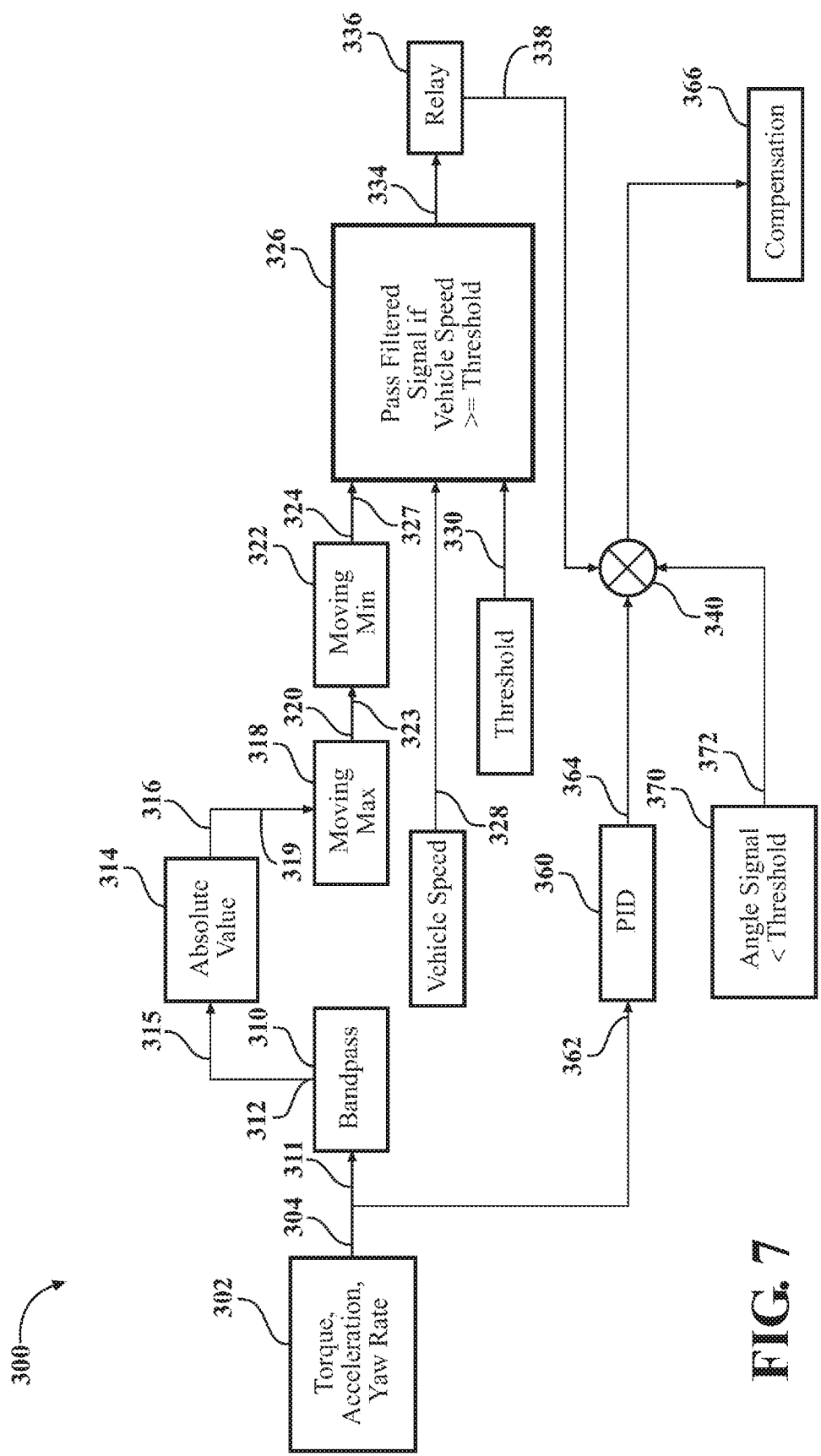
FIG. 7 is a schematic diagram of a control system for actively compensating excessive noise, vibration, and harshness (NVH) in a vehicle front suspension.

FIG. 7 is a schematic diagram of a control system 300 for actively compensating excessive noise, vibration, and harshness (NVH) in a vehicle front suspension. The control system 300 may be implemented using one or more hardware and/or software components. In some embodiments the control system 300 may be implemented entirely in software, which may run on one or more processors, such as the EPS ECU 214.

The control system 300 includes one or more sensors 302 configured to measure operating characteristics of the vehicle. Specifically, at least one of the sensors 302 is configured to sense vibration in the vehicle front suspension. The sensors 302 may include a torque sensor or an angle sensor of the EPS system 210. The sensors 302 may include other sensors, such as a speed sensor that measures the speed of the vehicle, an accelerometer that measures vehicle acceleration and/or a rotational sensor, such as a yaw sensor that measures a yaw rate of the vehicle. The sensors 302 generate one or more input signals 304 representing vibration in the vehicle front suspension. In some embodiments, the sensors 302 include a torque sensor, and the input signal 304 represents a difference in torque between the steering wheel and a steering linkage coupled to the front suspension of the vehicle. Such a torque difference may be influenced by either or both of driver action upon the steering wheel and/or by vibrations in the front suspension, such as excessive NVH.

A first bandpass filter 310 is configured to generate a first bandpass output signal 312 using a first bandpass input signal 311. In the example control system 300 shown on FIG. 7 the first bandpass input signal 311 is coupled to (i.e. equal to) the input signal 304. The first bandpass output signal 312 is the same as or proportional to the first bandpass input signal 311 at frequencies within a predetermined band (e.g. frequencies above a lower cutoff frequency and below an upper cutoff frequency). The first bandpass output signal 312 may be zero or substantially attenuated from the first bandpass input signal 311 at frequencies outside of the predetermined band. The first bandpass filter 310 may include a highpass filter (HPF) and a lowpass filter (LPF). For example, the first bandpass filter 310 may incorporate a first order LPF and a first-order HPF. The LPF may be a first-order filter as described by the following equations 1-3, wherein Ts is sample time in seconds. However, the LPF may be implemented in other ways, such as a higher-order filter.

$$Y(n) = \frac{X(n) + \frac{a}{Ts} * Y(n-1)}{1 + \frac{a}{Ts}} \quad \text{equation (1)}$$

$$f_{cut-off} = \frac{1}{2\pi a} \quad \text{equation (2)}$$

$$a = \frac{1}{2\pi f_{cut-off}} \quad \text{equation (3)}$$

The HPF may be a first-order filter as described by the following equations 4-6, wherein Ts is sample time in seconds. However, the HPF may be implemented in other ways, such as a higher-order filter.

$$Y(n) = \frac{b}{b+Ts}(X(n) - X(n-1) + Y(n-1)) \quad \text{equation (4)}$$

$$f_{cut-off} = \frac{1}{2\pi b} \quad \text{equation (5)}$$

$$b = \frac{1}{2\pi f_{cut-off}} \quad \text{equation (6)}$$

A first absolute value processor 314 is configured to produce a first absolute value (ABS) output signal 316 as the absolute value of a first ABS input signal 315. In some embodiments, and as shown in FIG. 7, the first ABS input signal 315 is coupled to (i.e. equal to) the first bandpass output signal 312. However, in other embodiments, the first ABS input signal 315 may be independent of the first bandpass output signal 312.

A first moving maximum processor 318 is configured to produce a first moving max. output signal 320 equal to a maximum value of a first moving max. input signal 319 over a first scanning window length of time. In other words, at any given time, the first moving maximum processor 318 sets the first moving max. output signal 320 equal to the largest value of the first moving max. input signal 319 over the first scanning window length of time prior to the given time. The first scanning window length of time may be, for example, 0.1 s. In some embodiments, and as shown in FIG. 7, the first moving max. input signal 319 is coupled to (i.e. equal to) the first ABS output signal 316. However, in other embodiments, the first moving max. input signal 319 may be independent of the first ABS output signal 316.

A moving minimum processor 322 is configured to produce a moving min. output signal 324 equal to a minimum value of a moving min. input signal 323 over a second scanning window length of time. In other words, at any given time, the moving minimum processor 322 sets the moving min. output signal 324 equal to the smallest value of the moving min. input signal 323 over the second scanning window length of time prior to the given time. The second scanning window length of time may be, for example, 0.2 s. In some embodiments, and as shown in FIG. 7, the moving min. input signal 323 is coupled to (i.e. equal to) the first moving max. output signal 320. However, in other embodiments, the moving min. input signal 323 may be independent of the first moving max. output signal 320.

A selector 326 is configured to produce a selector output signal 334 using a filtered signal input 327. Specifically, the selector 326 is configured to pass the filtered signal input 327 to the selector output signal 334 if and only if a vehicle speed signal 328 indicates that the vehicle speed is greater than or equal to a threshold speed. If the vehicle speed signal 328 indicates that the vehicle speed is less than the threshold speed, then the selector 326 is configured to set the selector output signal 334 to zero.

The threshold speed may be communicated to the selector 326 in the form of a threshold speed signal 330, as shown in FIG. 7. In some embodiments, the threshold speed may vary. In other embodiments, the threshold speed may have a fixed value. In some embodiments, and as shown in FIG. 7, the filtered signal input 327 is coupled to (i.e. equal to) the moving min. output signal 324. However, in other embodiments, the filtered signal input 327 may be independent of the moving min. output signal 324. For example, the filtered signal input 327 may be generated by the first moving maximum processor 318, and moving minimum processor 322 in a reverse order to the order shown in FIG. 7.

A relay 336 is coupled to the selector output signal 334 and is configured to assert, or to set a relay output 338 to a full-scale value in response to the selector output signal 334 exceeding an enabling threshold value. The relay 336 is configured to de-assert, or to set the relay output 338 to zero in response to the selector output signal 334 falling below the disabling threshold value.

A multiplier block 340 produces a compensation signal 366 by multiplying a controller output signal 364 by the relay output 338 and by an input monitoring signal 372, where the input monitoring signal 372 indicates a driver input causing the vibration in the vehicle front suspension. More specifically, the input monitoring signal 372 is generated by an input angle monitor 370 and is set to zero in response to a driver input causing the vibration in the vehicle front suspension. By setting the input monitoring signal 372 to zero, the input angle monitor 370 and the multiplier block 340 work together to drive the compensation signal 366 to zero in response to a driver input causing the vibration in the vehicle front suspension. Similarly, the relay output 338 and the multiplier block 340 work together to drive the compensation signal 366 to zero in response to the selector output signal 334 being below the disabling threshold value, which in turn may be caused by either the vehicle speed being less than the threshold speed and/or the filtered signal input 327 not exceeding the enabling threshold value. In other words, the selector 326, the relay 336, the input angle monitor 370, and the multiplier block 340 perform the primary functions of the method 250 for enabling active vibration.

The control system 300, as shown on FIG. 7, also includes an output controller 360 in the form of a proportional-integral-derivative (PID) controller, which is configured to generate the controller output signal 364 using a control loop input signal 362.

Other types of control methods may be used for the output controller 360. For example, the output controller 360 may be a proportional controller configured to generate the control output signal 362 proportional to an error signal, based on the difference between the control output signal 362 and a setting value. In another example, the output controller 360 may be a proportional-integral (PI) controller.

In the example control system 300 shown on FIG. 7 the control loop input signal 362 is coupled to (i.e. equal to) the input signal 304, however, the control loop input signal 362 may be otherwise based upon the input signal 304. For example, the control loop input signal 362 may be driven by a filtered signal 315, 316, 320, 324 that generated from the input signal 304 using one or more signal processing techniques.

Figure 8:
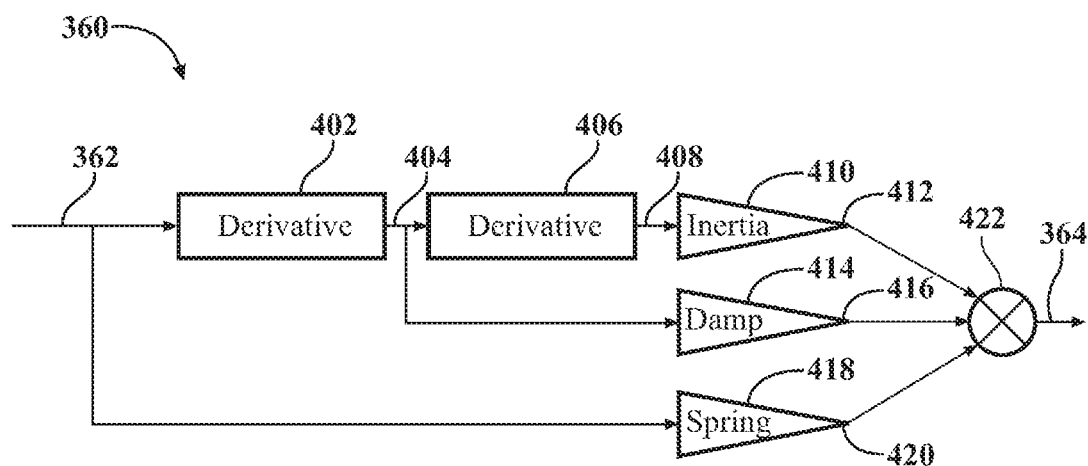
FIG. 8 is a schematic diagram of an output controller.

FIG. 8 shows an example embodiment of the PID controller 360, which generates the controller output signal 364 using the control loop input signal 362. Other, different implementations may be used for the PID controller 360. Specifically, the PID controller 360 includes a first derivative processor 402 configured to generate a first derivative signal 404 that is proportional to a rate of change of the control loop input signal 362. The PID controller 360 also includes a second derivative processor 406 configured to generate a second derivative signal 408 that is proportional to a rate of change of the first derivative signal 404. In other words, the second derivative signal 408 is the second derivative of the control loop input signal 362. The PID controller 360 also includes an inertia gain amplifier 410, a damping gain amplifier 414, and a spring gain amplifier 418. The inertia gain amplifier 410 is configured to generate an inertia signal 412 as the second derivative signal 408 multiplied by an inertia coefficient, which may also be called a derivative gain Kd. The damping gain amplifier 414 is configured to generate a damping signal 416 as the first derivative signal 404 multiplied by a damping coefficient, which may also be called a proportional gain Kp. The spring gain amplifier 418 is configured to generate a spring signal 420 as the control loop input signal 362 multiplied by a spring coefficient, which may also be called an integral gain Ki. The PID controller 360 also includes an adder block 422 configured to produce the controller output signal 364 as the sum of the inertia signal 412 and the damping signal 416 and the spring signal 420.

The example output controller 360 may be used, for example, where the control loop input signal 362 represents a position (i.e. the integral of a velocity with respect to time). The spring gain amplifier 418 would, thus, operate upon the position (i.e. the integral of the velocity), which is analogous to the operation of an integral gain Ki in a conventional PID loop. The damping gain amplifier 414 would operate upon the first derivative of the position (i.e. the velocity), which is analogous to the operation of a proportional gain Kp in a conventional PID loop. The inertia gain amplifier 410 would operate upon the second derivative of the position (i.e. the first derivative of the velocity), which is analogous to the operation of a derivative gain Kd in a conventional PID loop. In this way, the example output controller 360 may be implemented using only an adder block, multiplication (gain) blocks and two derivative processors, and thus requires less processing resources than other implementations that include integration functions.

The output controller 360 may be a conventional PID controller, which may calculate the control output signal 362 using the following equation:

$$P + I \cdot \frac{T_s}{2} \frac{z+1}{z-1} + D \frac{N}{1 + N \cdot \frac{T_s}{2} \frac{z+1}{z-1}} \qquad \text{equation (7)}$$

where P, I, and D are tuning constants, and $T_s$ is a sampling period. In some embodiments, the derivative turning constant may be zero, and the PID controller 360 may function as a proportional-integral (PI) controller.

Figure 9:
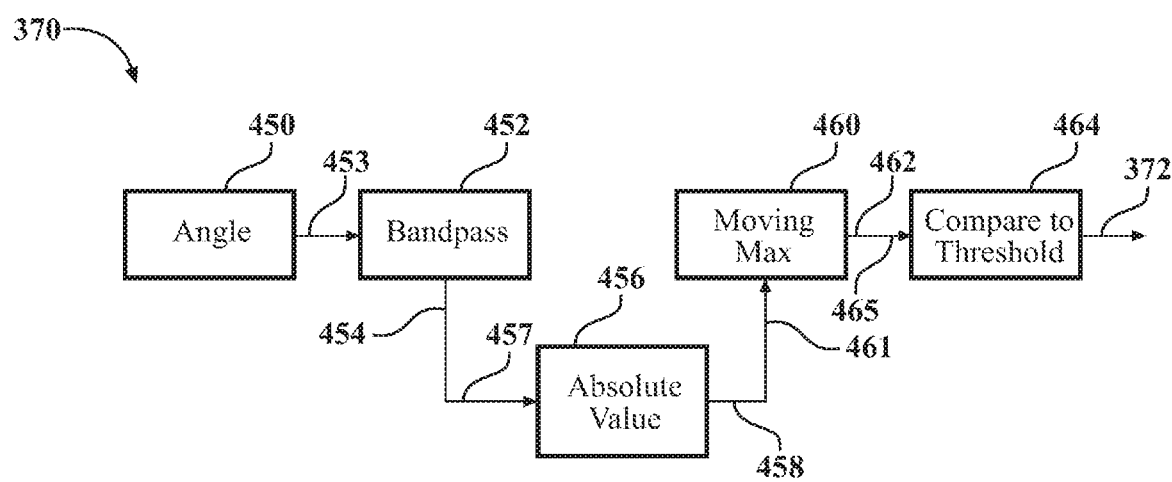
FIG. 9 is a schematic diagram of an input vibration detector for a control system for actively compensating excessive noise, vibration, and harshness (NVH) in a vehicle front suspension.

FIG. 9 shows an example implementation of the input angle monitor 370. Specifically, the input angle monitor 370 takes a steering input angle signal 450 that represents an angle of a handwheel that is operated by a driver of the vehicle. The input angle monitor 370 calculates an input vibration signal 465 based upon the steering input angle signal 450 and compares that input vibration signal with an input vibration threshold value to determine if the steering input angle is indicative of a driver input causing the vibration in the vehicle front suspension. Thus, the input angle monitor 370 may prevent the control system 300 from producing the compensation signal 366 if a steering input angle indicates a driver input causing the vibration in the vehicle front suspension.

Specifically, the example input angle monitor 370 shown in FIG. 9 includes a second bandpass filter 452, which is configured to generate a second bandpass output signal 454 using a second bandpass input signal 453. In the example input angle monitor 370 shown on FIG. 9 the second bandpass input signal 453 is coupled to (i.e. equal to) the steering input angle signal 450. The second bandpass filter 452 may be similar or identical in construction and/or function to the first bandpass filter 310. The second bandpass output signal 454 is the same as or proportional to the second bandpass input signal 453 at frequencies within a predetermined band (e.g. frequencies above a lower cutoff frequency and below an upper cutoff frequency) and attenuated for frequencies outside of that predetermined band. The frequency band used by the second bandpass filter 452 may be the same as or different from the frequency band of the first bandpass filter 310.

The example input angle monitor 370 shown in FIG. 9 also includes a second absolute value processor 456 that is configured to produce a second absolute value (ABS) output signal 458 as the absolute value of a second ABS input signal 457. The second absolute value processor 456 may be similar or identical in construction and function to the first absolute value processor 314. In some embodiments, and as shown in FIG. 9, the second ABS input signal 457 is coupled to (i.e. equal to) the second bandpass output signal 454. However, in other embodiments, the second ABS input signal 457 may be independent of the second bandpass output signal 454.

The example input angle monitor 370 shown in FIG. 9 also includes a second moving maximum processor 460 that is configured to produce a second moving max. output signal 462 equal to a maximum value of a second moving max. input signal 461 over a predetermined length of time. In other words, at any given time, the second moving maximum processor 460 sets the second moving max. output signal 462 equal to the largest value of the second moving max. input signal 461 over the predetermined length of time prior to the given time. The predetermined length of time may be, for example, 0.1 s. In some embodiments, and as shown in FIG. 9, the second moving max. input signal 461 is coupled to (i.e. equal to) the second ABS output signal 458. However, in other embodiments, the second moving max. input signal 461 may be independent of the second ABS output signal 458. For example, the second moving max. input signal 461 may be set equal to the second bandpass output signal 454.

The example input angle monitor 370 shown in FIG. 9 also includes a comparator 464 that is configured to assert the input monitoring signal 372 in response to an input vibration signal 465 being less than an input vibration threshold value, which indicates a driver input not causing vibration in the vehicle front suspension. Asserting the input monitoring value 372 may include setting the input monitoring value 372 to a high or non-zero value. Likewise, the a comparator 464 is configured to de-assert (i.e. set to a low or zero value) the input monitoring signal 372 in response to the input vibration signal 465 being greater than the input vibration threshold value, which indicates a driver input causing the vibration in the vehicle front suspension. De-asserting the input monitoring value 372 may include setting the input monitoring value 372 to a low or zero value. The input vibration threshold value may be predetermined and fixed. Alternatively, input vibration threshold value may be varied depending on one or more factors, such as vehicle speed, driving mode, etc. In some embodiments, and as shown in FIG. 9, the input vibration signal 465 is coupled to (i.e. equal to) the second moving max. output signal 462. However, in other embodiments, the input vibration signal 465 may be produced differently. For example, the comparator input 465 may be set equal to the second ABS output signal 458 or using a second moving minimum processor.

Figure 10A:
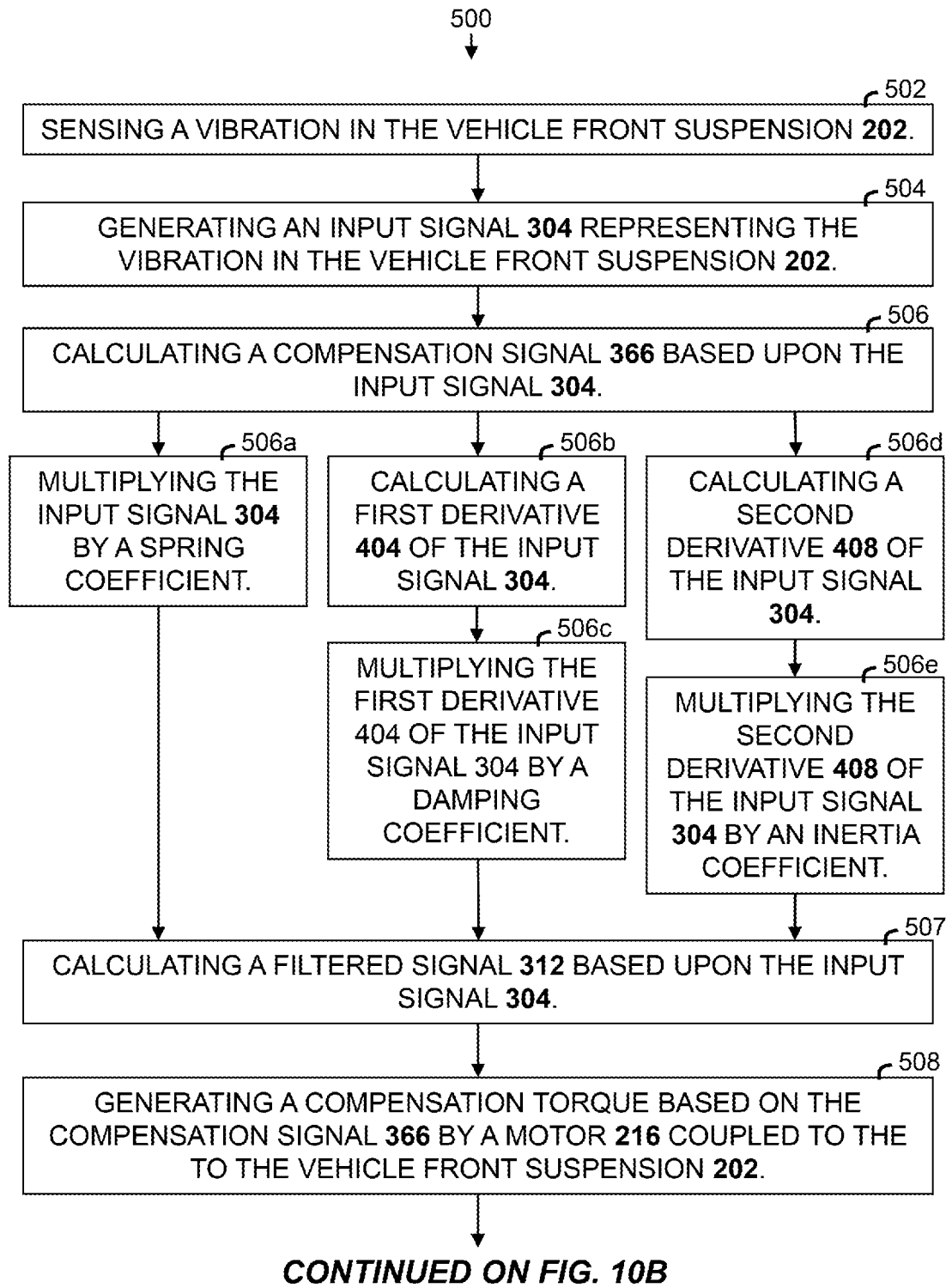
FIGS. 10A-10B shows a flow diagram showing steps in a method of actively damping a vehicle front suspension.
Figure 10B:
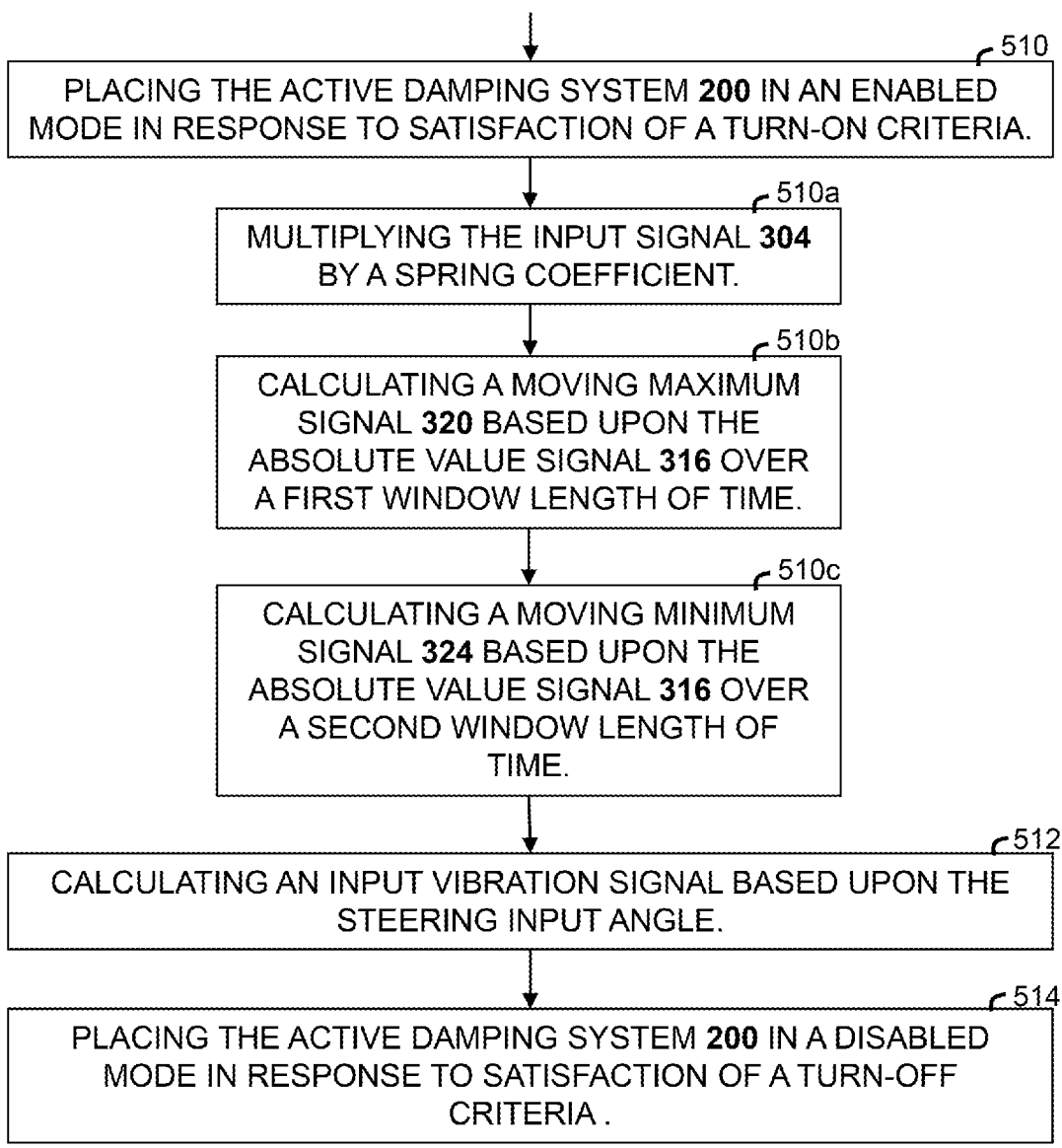

FIGS. 10A-10B is flow diagram showing steps in a method 500 for actively damping a vehicle front suspension. The method 500 may describe operation of the active damping system 200. The method 500 includes sensing a vibration in the vehicle front suspension 202 at step 502. Step 502 may be performed using one or more sensors 302 configured to measure operating characteristics of the vehicle. Such sensors 302 may include a torque sensor, which may also be called a "steering torque sensor", or an angle sensor of the EPS system 210. The sensors 302 may include other sensors, such as a speed sensor that measures the speed of the vehicle, an accelerometer that measures vehicle acceleration and/or a rotational sensor, such as a yaw sensor that measures a yaw rate of the vehicle.

The method 500 also includes generating an input signal 304 representing the vibration in the vehicle front suspension 202 at step 504. This input signal 304 may be generated directly by the one or more sensors 302. Alternatively, the input signal 304 may be generated indirectly, such as by using one or more signal processors operating upon data from one or more sensors 302.

The method 500 also includes calculating a compensation signal 366 based upon the input signal 304 at step 506. Step 506 may be performed by a control system 300 as shown, for example, in the schematic diagram of FIG. 7. Step 506 of calculating the compensation signal 366 based upon the input signal 304 may be performed using at least one of a proportional control, an integral control, or a derivative control method, which may be performed by a proportional-integral-derivative (PID) controller 360.

Step 506 of calculating the compensation signal 366 based upon the input signal 304 may include multiplying the input signal 304 by a spring coefficient, which may also be called an integral gain Ki at sub-step 506a. Sub-step 506a may be performed, for example, by the spring gain amplifier 418.

Step 506 of calculating the compensation signal 366 based upon the input signal 304 may include calculating a first derivative 404 of the input signal 304 at sub-step 506b. Sub-step 506b may be performed, for example, by the first derivative processor 402. Step 506 may further include multiplying the first derivative 404 of the input signal 304 by a damping coefficient, which may also be called a proportional gain Kp at sub-step 506c. Sub-step 506c may be performed, for example, by the damping gain amplifier 414.

Step 506 of calculating the compensation signal 366 based upon the input signal 304 may include calculating a second derivative 408 of the input signal 304 at sub-step 506d. Sub-step 506d may be performed, for example, by the second derivative processor 406 together with the first derivative processor 402. Step 506 may further include multiplying the second derivative 408 of the input signal 304 by an inertia coefficient, which may also be called a derivative gain Kd at sub-step 506e. Sub-step 506e may be performed, for example, by the inertia gain amplifier 410.

In some embodiments, the method 500 may include generating a filtered signal 312 based upon the input signal 304 and including only frequencies within a predetermined frequency range at step 507. For example, the bandpass filter 310 may perform this step 507 by passing only frequencies of the input signal 304 which are within predetermined frequency range to generate the filtered signal 312.

The method 500 concludes by generating a compensation torque based on the compensation signal 366 by a motor 216 coupled to the vehicle front suspension 202 at step 508. In some embodiments, the motor 216 is part of an electronic power steering system 210 configured to steer the vehicle.

However, the motor 216 may be another motor, such as a motor that is dedicated to vibration compensation.

In some embodiments, the method 500 may include placing the active damping system 200 in an enabled mode in response to satisfaction of a turn-on criteria at step 510. Satisfaction of the turn-on criteria may be as described, above, with reference to FIG. 6. The compensation torque may be generated only with the active damping system 200 in the enabled mode. In other words, the active damping system 200 may perform step 508 only with the active damping system 200 in the enabled mode. In some embodiments, the turn-on criteria includes a speed of the vehicle being greater than a speed threshold value. Alternatively or additionally, the turn-on criteria may include a steering input angle that is indicative of a driver input not causing the vibration in the vehicle front suspension.

In some embodiments, step 510 of placing the active damping system 200 in an enabled mode in response to satisfaction of the turn-on criteria may include calculating an absolute value signal 316 based upon the input signal 304 at sub-step 510a. Sub-step 510a may be performed by the first absolute value processor 314, which may operate upon a secondary signal based upon input signal 304, such as the first bandpass output signal 312 as shown in FIG. 7. Alternately, the first absolute value processor 314, may operate directly upon the input signal 304.

Step 510 may also include calculating a moving maximum signal 320 based upon the absolute value signal 316 over a first window length of time at sub-step 510b. The moving maximum signal 320 may be calculated by the first moving maximum processor 318, which may operate directly upon the absolute value signal 316 or some other signal that is based upon the absolute value signal 316.

Step 510 may also include calculating a moving minimum signal 324 based upon the absolute value signal 316 over a second window length of time at sub-step 510c. The moving minimum signal 324 may be calculated by a moving minimum processor 322, which may operate directly upon the absolute value signal 316 or some other signal that is based upon the absolute value signal 316. For example, the moving minimum processor 322 may operate upon the moving maximum signal 320 as shown in FIG. 7.

The turn-on criteria of step 510 may include the moving minimum signal 324 being greater than an enabling threshold value. For example, the relay 336 in the example control system 300 shown in FIG. 7 may perform this determination by asserting or setting the relay output 338 in response to the moving minimum signal 324 exceeding the enabling threshold value, at least while the selector 326 passes the moving minimum signal 324 to the selector output signal 334.

Alternatively or additionally, the turn-on criteria of step 510 may include the moving maximum signal 320 being greater than an enabling threshold value. For example, in a modified version of the example control system 300 shown in FIG. 7 in which the first moving maximum processor 318 and the moving minimum processor 322, are swapped, the relay 336 may perform this determination by asserting or setting the relay output 338 in response to the moving maximum signal 320 exceeding the enabling threshold value, at least while the selector 326 passes the moving maximum signal 320 to the selector output signal 334.

In some embodiments, the method 500 may include calculating an input vibration signal based upon the steering input angle at step 512. The turn-on criteria may include the input vibration signal being less than an input vibration threshold value, which corresponds to the steering input angle that is not indicative of a driver input causing the vibration in the vehicle front suspension.

In some embodiments, the method 500 may include placing the active damping system 200 in a disabled mode in response to satisfaction of a turn-off criteria at step 514. The turn-off criteria may include, for example, one of the moving maximum signal 320 or the moving minimum signal 324 being less than a disabling threshold value. Additionally or alternatively, the turn-off criteria may include the steering input angle that is indicative of a driver input causing the vibration in the vehicle front suspension. Additionally or alternatively, the turn-off criteria may include the vehicle speed being below a turn-off speed threshold.

Figure 11A:
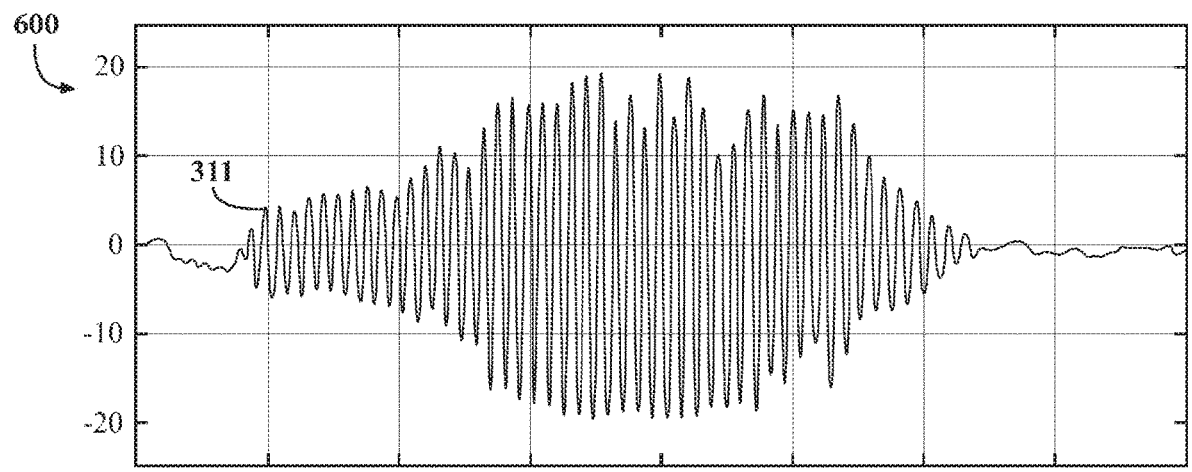
FIGS. 11A and 11B show graphs of input and output signals of a first bandpass filter, respectively.
Figure 11B:
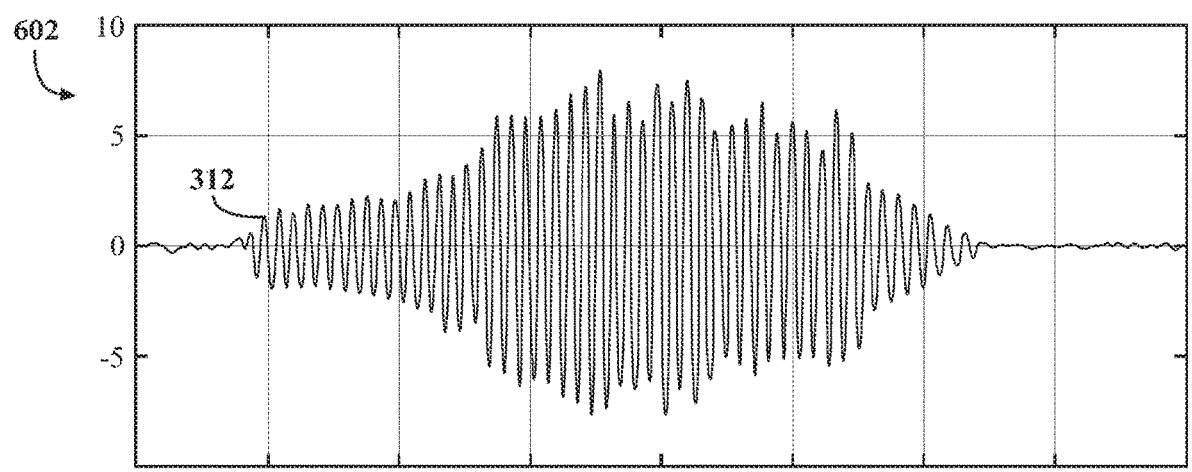

FIGS. 11A-11B show graphs of first input and first output signals 311, 312 of the first bandpass filter 310. Specifically, FIG. 11A shows a first graph 600 of the first bandpass input signal 311 over a time period, and FIG. 11B shows second graph 602 of the first bandpass output signal 312 over the same time period. The first bandpass output signal 312 is similar in shape to the first bandpass input signal 311 except with reductions at high frequencies (shown at the right end of the second graph 602), and with reductions at low frequencies (shown at the left end of the second graph 602). FIG. 11B shows the first bandpass output signal 312 having a lower amplitude than the first bandpass input signal 311. The first bandpass input signal 311 varies between about −20 and +20 on the vertical axis, where the first bandpass output signal 312 only varies between about −7 and +7. This reduction in amplitude is due to an attenuation of the signal caused by the first bandpass filter 310.

Figure 12A:
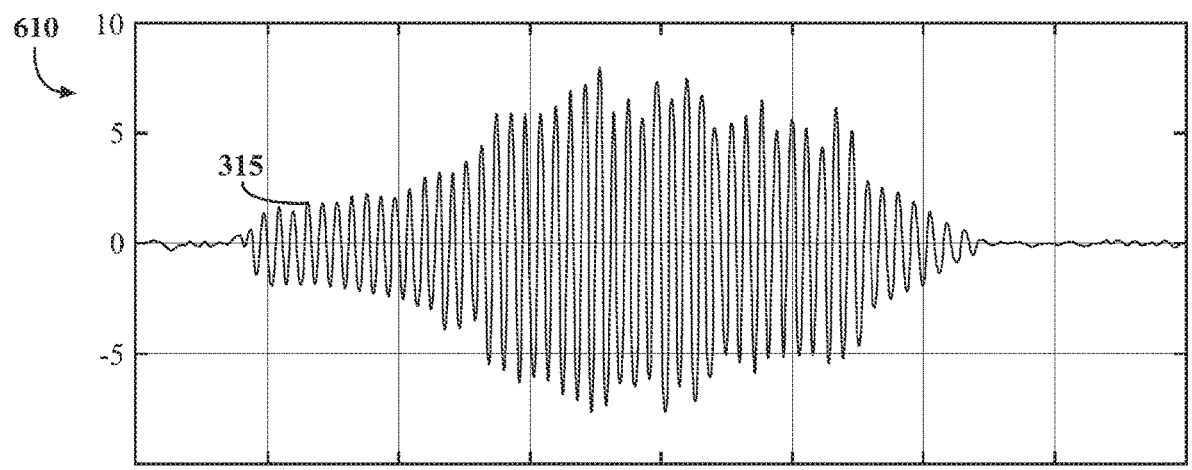
FIGS. 12A and 12B show graphs of input and output signals of a first absolute value processor, respectively.
Figure 12B:
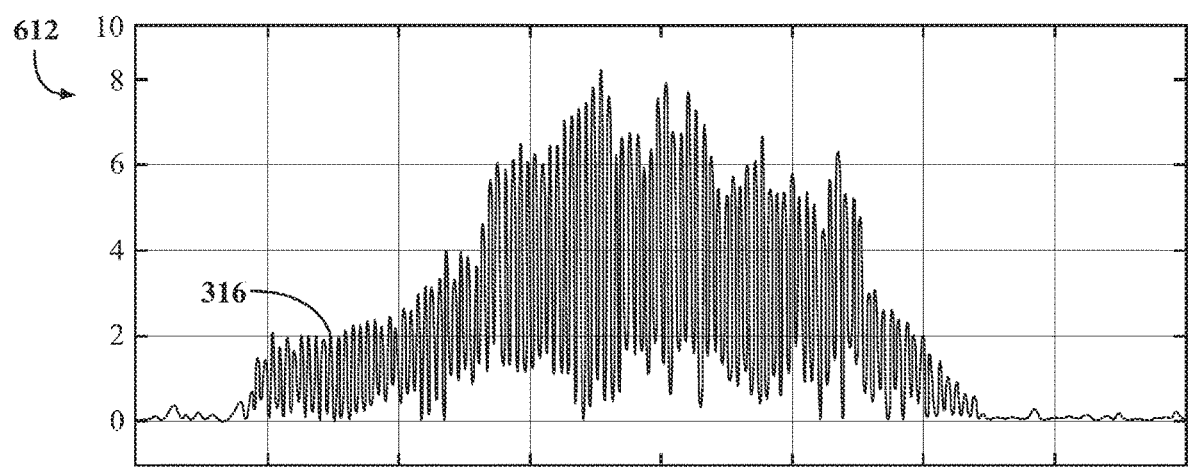

FIGS. 12A-12B shows graphs of input and output signals 315, 316 of the first absolute value processor 314. Specifically, FIG. 12A shows a third graph 610 of the first ABS input signal 315 over a time period, and FIG. 12B shows a fourth graph 612 of the first ABS output signal 316 over the same time period. Note that the first ABS output signal 316 is always non-negative, with negative values in the first ABS input signal 315 converted to corresponding positive values in the first ABS output signal 316.

Figure 13A:
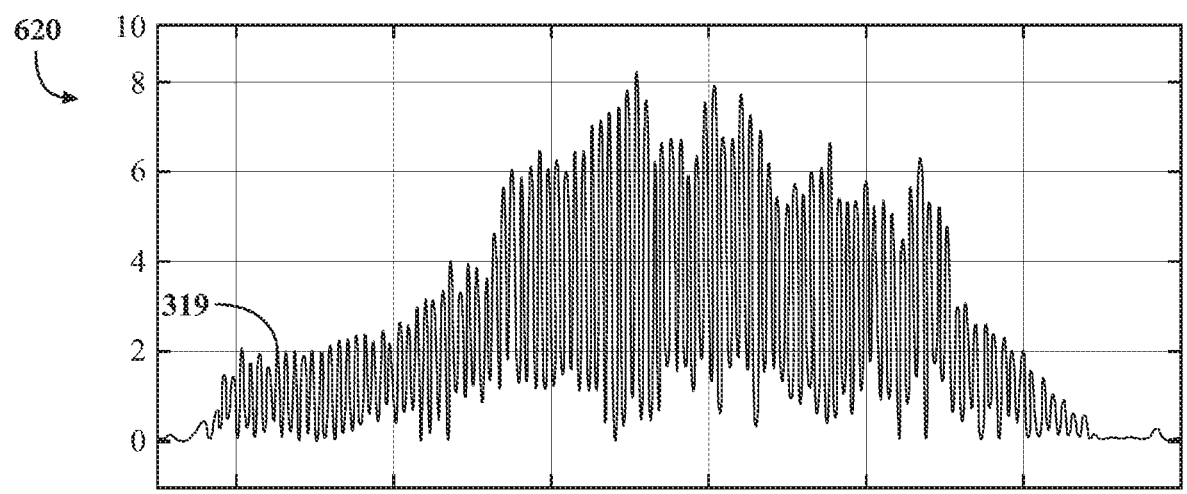
FIGS. 13A and 13B show graphs of input and output signals of a first moving maximum processor, respectively.
Figure 13B:
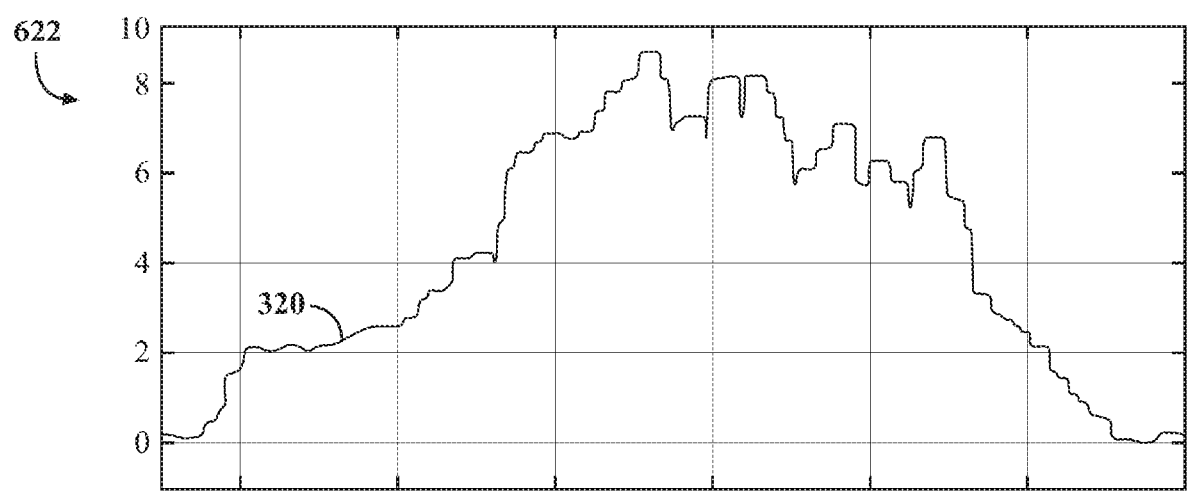

FIGS. 13A-13B shows graphs of input and output signals 319, 320 of the first moving maximum processor 318. Specifically, FIG. 13A shows a fifth graph 620 of the first moving max. input signal 319 over a time period, and FIG. 13B shows a sixth graph 622 of the first moving max. output signal 320 over the same time period.

Figure 14A:
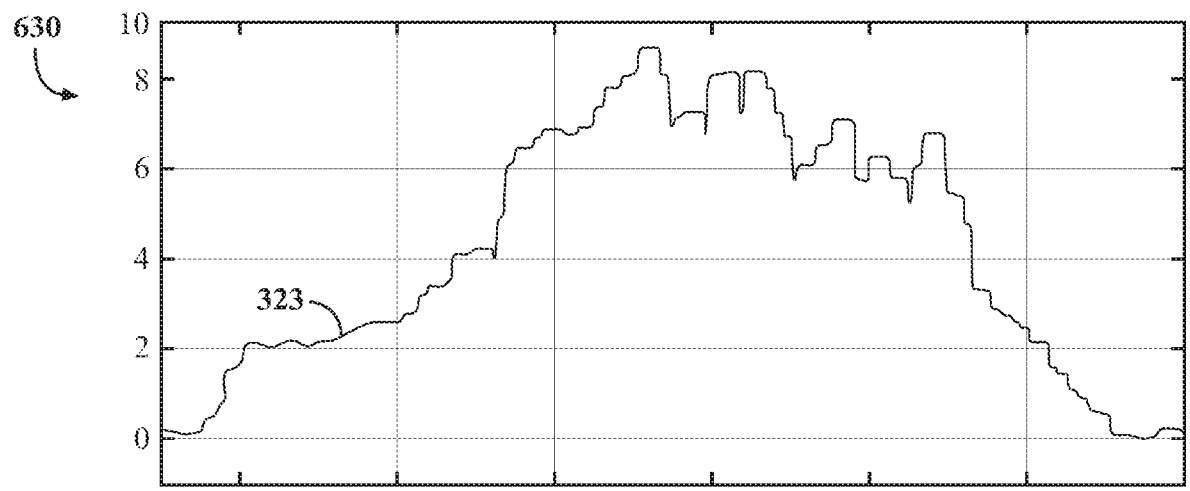
FIGS. 14A and 14B show graphs of input and output signals of a moving minimum processor, respectively.
Figure 14B:
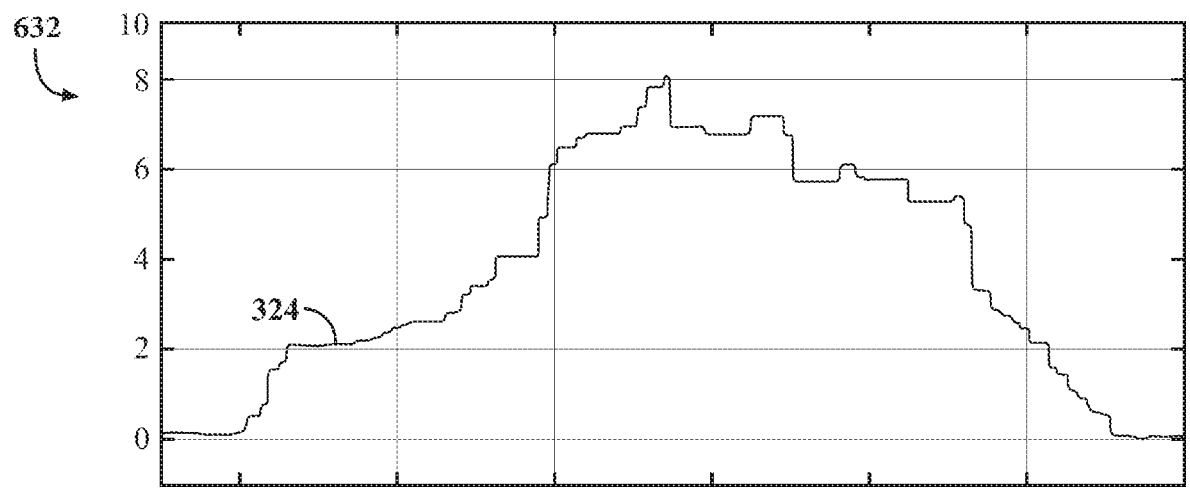

FIGS. 14A-14B shows graphs of input and output signals 323, 324 of the moving minimum processor 322. Specifically, FIG. 14A shows a seventh graph 630 of the moving min. input signal 323 over a time period, and FIG. 14B shows a eighth graph 632 of the moving min. output signal 316 over the same time period.

Figure 15A:
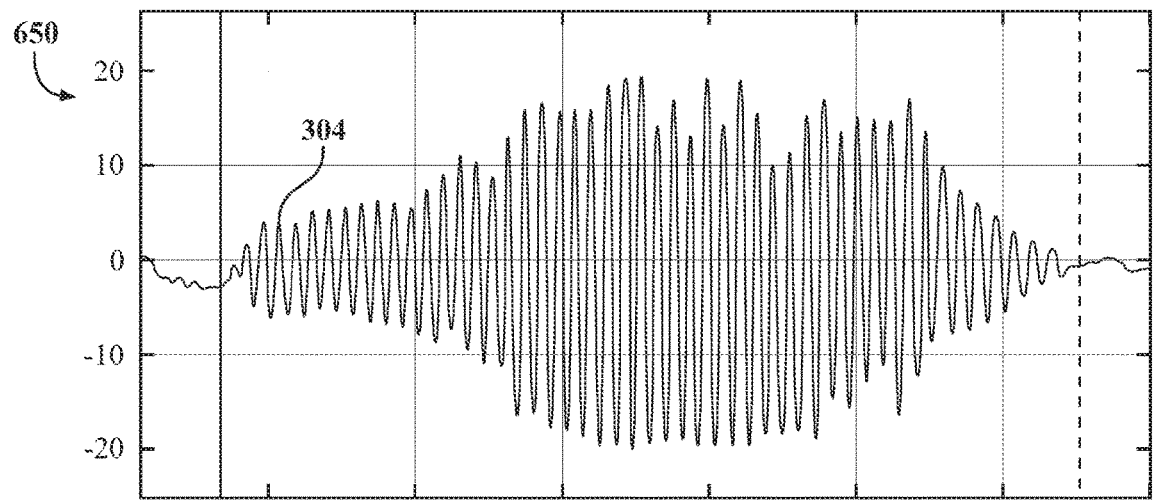
FIGS. 15A, 15B, and 15C show graphs of a non-compensated vibration signal, a compensation signal produced by a system of the present disclosure, and a compensated vibration signal resulting from application of the compensation signal, respectively.
Figure 15B:
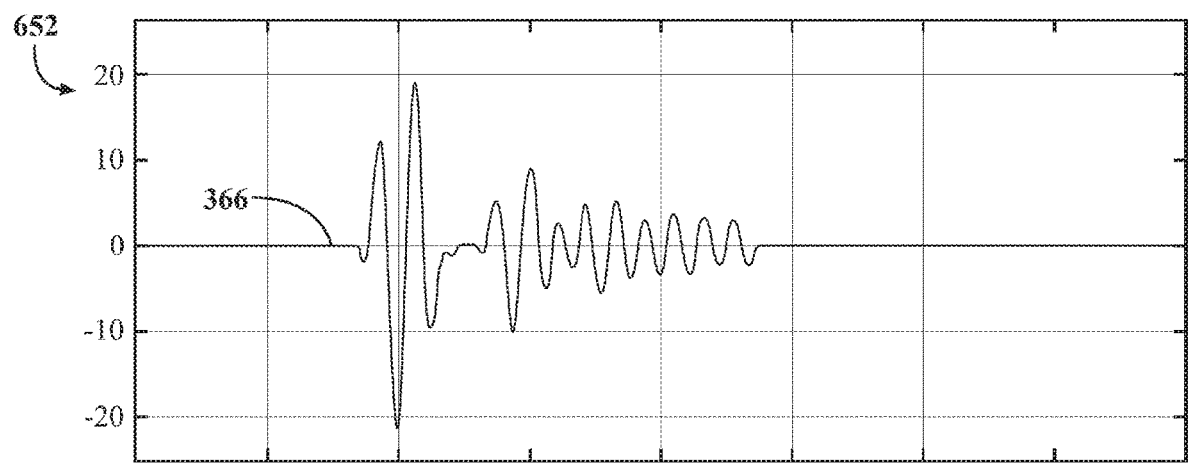
Figure 15C:
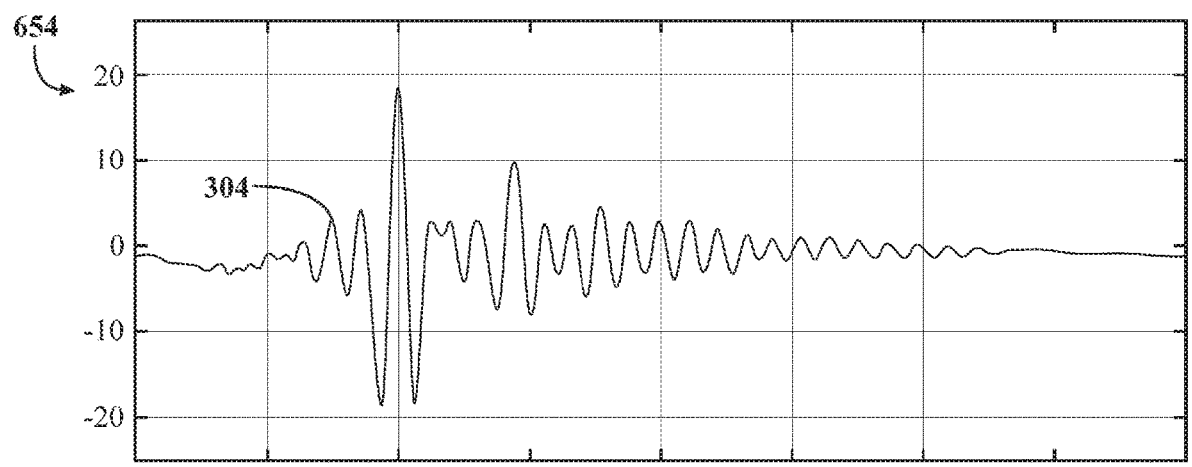

FIGS. 15A-15C show graphs of an input signal 304 without active damping, a compensation signal 366, and an input signal 304 with active damping, respectively. Specifically, FIG. 15A shows a tenth graph 650 of the input signal 304 illustrating an excessive NVH condition and without the active damping system 200 being enabled. FIG. 15B shows an eleventh graph 652 of the compensation signal 366 produced by the system 200 of the present disclosure for damping the excessive NVH condition. The compensation signal 366 shown in the eleventh graph 552 is generated by the PID controller 360 with a setpoint that is fixed at zero (i.e. the target profile signal 354 is fixed at zero). The target profile signal 354 fixed at zero provides for a maximum response of the system 200 for actively damping the excessive NVH condition. FIG. 15C shows a twelfth graph 654 showing the input signal 304 illustrating an excessive NVH condition that is reduced by application the compensation torque Tc, and where the compensation torque Tc is generated in accordance with the compensation signal 366.

Figure 16:
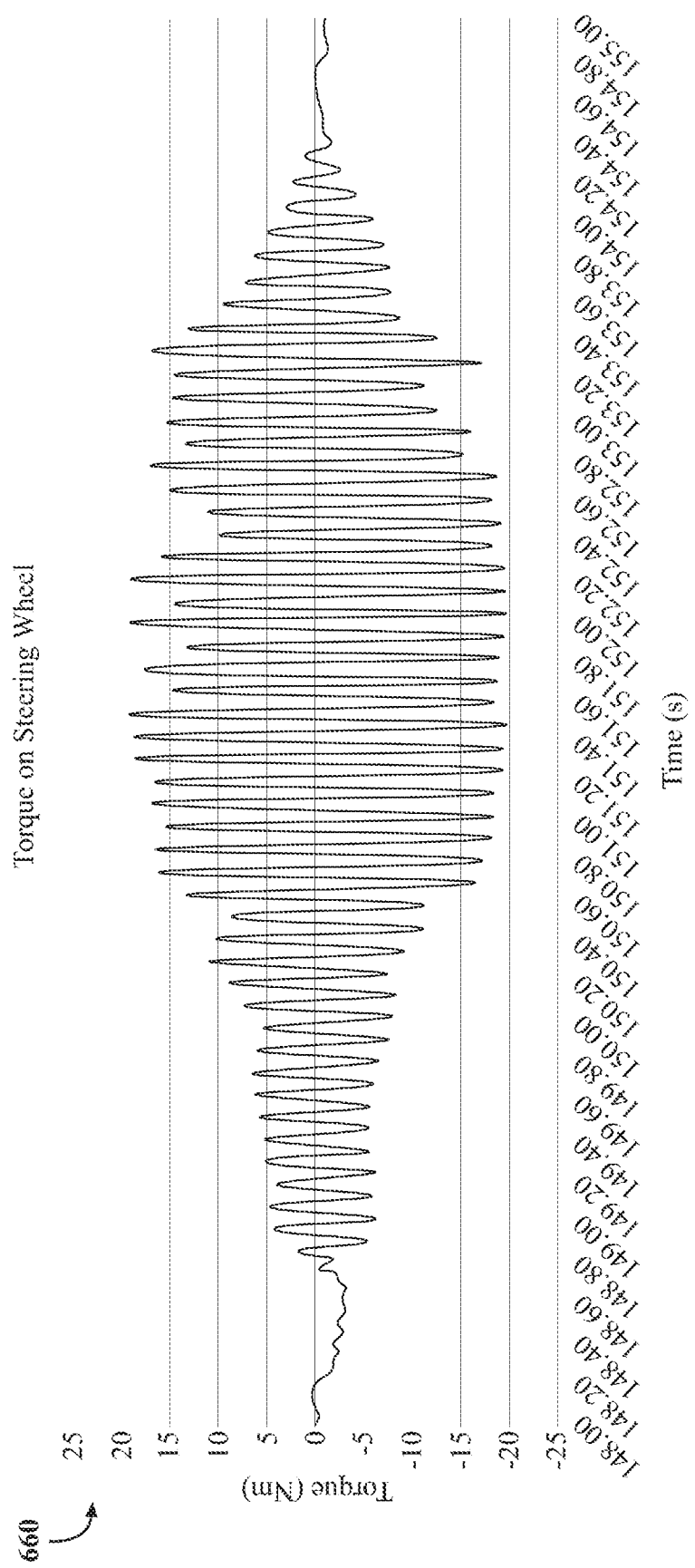
FIG. 16 shows a graph of torque on a steering wheel of a vehicle without active compensation.
Figure 17:
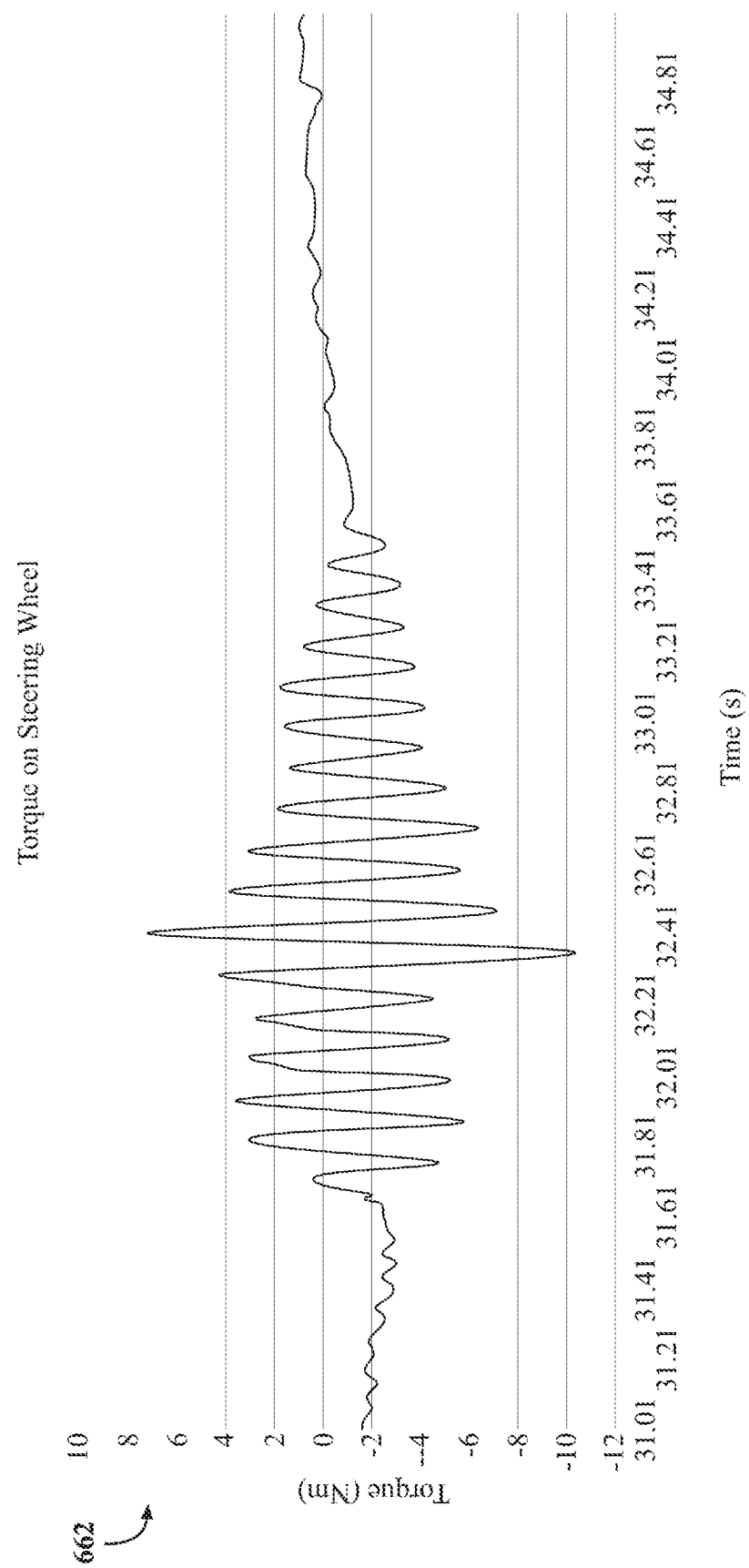
FIG. 17 shows a graph of torque on a steering wheel of a vehicle with active compensation.

FIG. 16 shows a thirteenth graph 660 showing torque on a steering wheel of a vehicle without active compensation; and FIG. 17 shows a fourteenth graph 664 showing torque on a steering wheel of a vehicle with active compensation. Specifically, FIGS. 16-17 show actual test results of an excessive NVH condition with and without active compensation, respectively.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of actively damping a front suspension of a vehicle, comprising:
   sensing a vibration in the front suspension;
   generating an input signal representing the vibration in the front suspension;
   calculating a compensation signal based upon the input signal; and
   generating a compensation torque by a motor coupled to the front suspension, the compensation torque based on the compensation signal,
   wherein sensing the vibration in the front suspension comprises sensing the vibration with at least one of: a steering torque sensor, an angle sensor of an electric power steering (EPS) system, or a yaw sensor configured to measure a yaw rate of the vehicle.

2. The method of claim 1, wherein sensing the vibration in the front suspension comprises sensing the vibration with a steering torque sensor.

3. The method of claim 1, further comprising:
   placing an active damping system in an enabled mode in response to satisfaction of a turn-on criteria;
   wherein the compensation torque is only generated with the active damping system in the enabled mode.

4. The method of claim 3, wherein the turn-on criteria includes a speed of the vehicle being greater than a speed threshold value.

5. The method of claim 3, wherein the turn-on criteria includes a steering input angle indicative of driver input not causing the vibration in the front suspension.

6. The method of claim 5, further comprising:
   calculating an input vibration signal based upon the steering input angle; and
   wherein the steering input angle indicative of driver input not causing the vibration in the front suspension comprises the input vibration signal being less than an input vibration threshold value.

7. The method of claim 3, further comprising:
   calculating an absolute value signal based upon the input signal;
   calculating a moving maximum signal based upon the absolute value signal over a first window length of time;
   calculating a moving minimum signal based upon the absolute value signal over a second window length of time; and
   wherein the turn-on criteria comprises one of the moving maximum signal or the moving minimum signal being greater than an enabling threshold value.

8. The method of claim 7, further comprising:
   placing the active damping system in a disabled mode in response to satisfaction of a turn-off criteria; and
   wherein the turn-off criteria comprises one of the moving maximum signal or the moving minimum signal being less than a disabling threshold value.

9. The method of claim 1, further comprising:
   generating a filtered signal based upon the input signal and including only frequencies within a predetermined frequency range.

10. The method of claim 1, wherein calculating the compensation signal based upon the input signal comprises using at least one of a proportional control, an integral control, or a derivative control method.

11. The method of claim 10, wherein the at least one of the proportional control, the integral control, or the derivative control method is performed by a proportional-integral-derivative (PID) controller.

12. The method of claim 10, wherein calculating the compensation signal based upon the input signal comprises multiplying the input signal by a spring coefficient.

13. The method of claim 10, wherein calculating the compensation signal based upon the input signal comprises calculating a first derivative of the input signal; and
   multiplying the first derivative of the input signal by a damping coefficient.

14. The method of claim 10, wherein calculating the compensation signal based upon the input signal comprises calculating a second derivative of the input signal; and
   multiplying the second derivative of the input signal by an inertia coefficient.

15. A system for actively damping a front suspension of a vehicle, comprising:
   a sensor configured to sense a vibration in the front suspension;
   an electronic control unit configured to generate a compensation signal to reduce the vibration in the front suspension; and
   a motor configured to apply a compensation torque to the front suspension, wherein the compensation torque is based upon the compensation signal,
   wherein the sensor includes at least one of: a steering torque sensor, an angle sensor of an electric power steering (EPS) system, or a yaw sensor configured to measure a yaw rate of the vehicle.

16. The system of claim 15, wherein the motor is an actuator of an electric power steering system configured to steer the vehicle.

17. The system of claim 16, wherein the electric power steering system comprises an electrically-powered recirculating-ball steering gear assembly.

18. The system of claim 15, wherein the sensor is one of a yaw rate sensor or a torque sensor or an output angle sensor of an electric power steering system configured to steer the vehicle.

19. A system for actively damping vibration in a front suspension of a vehicle, comprising:
   an electronic control unit configured to generate a compensation signal to compensate the vibration in the front suspension; and
   a motor configured to apply a compensation torque to the front suspension, the compensation torque based upon the compensation signal in an active damping mode;

wherein the system is in the active damping mode in response to satisfaction of a turn-on criteria; and wherein the turn-on criteria includes both of: a steering input shaft vibration being less than a vibration threshold, and a speed of the vehicle being greater than a threshold speed.

20. The system of claim 19, further comprising a sensor configured to sense the vibration in the front suspension of the vehicle, and wherein the sensor is one of a yaw rate sensor or a torque sensor or an output angle sensor of an electric power steering system configured to steer the vehicle.

* * * * *